(12) United States Patent
Hou et al.

(10) Patent No.: US 12,103,628 B2
(45) Date of Patent: Oct. 1, 2024

(54) CAMERA HOUSING DEVICE, CAMERA EQUIPMENT AND REAR VIEW SYSTEM

(71) Applicant: SHENZHEN APEMAN INNOVATIONS TECHNOLOGY CO., LTD., Shenzhen (CN)

(72) Inventors: Jun Hou, Shenzhen (CN); Yanli Huang, Shenzhen (CN)

(73) Assignee: Shenzhen Apeman Innovations Technology Co., Ltd., Shenzhen (CN)

( * ) Notice: Subject to any disclaimer, the term of this patent is extended or adjusted under 35 U.S.C. 154(b) by 217 days.

(21) Appl. No.: 17/828,823

(22) Filed: May 31, 2022

(65) Prior Publication Data

US 2022/0396328 A1    Dec. 15, 2022

(30) Foreign Application Priority Data

Jun. 11, 2021   (CN) .......................... 202110657366.6

(51) Int. Cl.
   *B62J 6/26*   (2020.01)
   *B62J 6/015*   (2020.01)
   (Continued)

(52) U.S. Cl.
   CPC .................. *B62J 6/26* (2020.02); *B62J 6/015* (2020.02); *B62J 6/045* (2020.02); *B62J 6/057* (2020.02);
   (Continued)

(58) Field of Classification Search
   CPC .. B62J 6/26; B62J 50/22; H04N 23/51; H01R 13/717; H01R 13/7175
   (Continued)

(56) References Cited

U.S. PATENT DOCUMENTS

2007/0071423 A1   3/2007   Fantone et al.
2011/0057781 A1   3/2011   Lee
(Continued)

FOREIGN PATENT DOCUMENTS

CN   202043766 U   11/2011
CN   203137384 U    8/2013
(Continued)

OTHER PUBLICATIONS

The Extended European Search Report issued in corresponding EP Application No. EP22176870.8, mailed Oct. 21, 2022, pp. 1-14.
(Continued)

*Primary Examiner* — Kam Wan Ma
(74) *Attorney, Agent, or Firm* — Troutman Pepper Hamilton Sanders LLP; Michael K. Jones; Matthew J. Esserman

(57) ABSTRACT

A camera housing device is provided in this disclose, including a base, a cover, a first electrical connection terminal, a first indicating light, and a second electrical connection terminal. A receiving space is defined on the base to receive a camera. The cover is positioned on the base and covers the receiving space. The first electrical connection terminal is positioned on the base. The first indicating light is positioned on the cover. The cover is capable of emitting a warning light according to a warning signal sent by the camera. The second electrical connection terminal is positioned on the cover and electronically coupled with the first electrical connection terminal. A camera equipment and a rear view system are also provided in this discloses.

19 Claims, 16 Drawing Sheets

(51) Int. Cl.
  *B62J 6/045* (2020.01)
  *B62J 6/057* (2020.01)
  *B62J 45/41* (2020.01)
  *B62J 50/22* (2020.01)
  *H04N 23/51* (2023.01)

(52) U.S. Cl.
  CPC .............. *B62J 45/41* (2020.02); *B62J 50/22* (2020.02); *H04N 23/51* (2023.01)

(58) Field of Classification Search
  USPC .......................................... 439/490; 340/432
  See application file for complete search history.

(56) References Cited

U.S. PATENT DOCUMENTS

| | | | |
|---|---|---|---|
| 2015/0228066 A1* | 8/2015 | Farb | G06V 20/58 |
| | | | 348/148 |
| 2016/0014377 A1* | 1/2016 | Fiegert | F16M 13/02 |
| | | | 348/148 |
| 2016/0355126 A1 | 12/2016 | Anderson et al. | |
| 2017/0010519 A1* | 1/2017 | Tang | H04N 23/51 |

FOREIGN PATENT DOCUMENTS

| | | |
|---|---|---|
| CN | 104276232 A | 1/2015 |
| CN | 104908856 A | 9/2015 |
| CN | 105984532 A | 10/2016 |
| CN | 205707004 U | 11/2016 |
| CN | 206960836 U | 2/2018 |
| CN | 207510579 U | 6/2018 |
| CN | 108417086 A | 8/2018 |
| CN | 212260790 U | 1/2021 |
| CN | 113562102 A | 10/2021 |
| FR | 2874202 A1 | 2/2006 |
| GB | 2572747 A | 10/2019 |
| TW | 201018616 A | 5/2010 |

OTHER PUBLICATIONS

First Office Action issued in corresponding CN Application No. CN202110657366.6, mailed Jun. 16, 2022, pp. 1-9, Beijing, China.

* cited by examiner

CAMERA HOUSING DEVICE, CAMERA EQUIPMENT AND REAR VIEW SYSTEM

CROSS REFERENCE TO RELATED APPLICATIONS

This application claims priority to Chinese Application No. 202110657366.6 filed Jun. 11, 2021, which is incorporated herein by reference in its entirety.

TECHNICAL FIELD

The present disclosure relates to a field of an image technology, more particularly to a camera housing device, a camera equipment, and a rear view system.

BACKGROUND

A riding equipment (e.g. bicycle) is a common means of transportation in our daily life. A user (rider) needs to often carry out emergency braking or other operations, when riding on the riding equipment. If passers-by and/or vehicles behind the riding equipment don't give way in time, it is easily to have collision accidents with the riding equipment. The safety of the user on the riding equipment is affected.

SUMMARY

To solve the above-mentioned problems, an embodiment of the present disclosure provides a camera housing device, a camera equipment, and a rear view system for improving the user's safety.

A camera housing device includes a base, a cover, a first electrical connection terminal, a first indicating light, and a second electrical connection terminal. A receiving space may be defined on the base to receive a camera. The cover is provided to cover the receiving space. The first electrical connection terminal is provided on the base. The first indicating light is provided on the cover for emitting warning light. The second electrical connection terminal is provided on the cover and electronically coupled to the first indicating light. The second electrical connection terminal is electronically coupled to the first electrical connection terminal when the cover covers the receiving space.

A camera equipment includes a camera housing device and a camera. The camera housing device includes a base, a cover, a first electrical connection terminal, a first indicating light, and a second electrical connection terminal. A receiving space is defined on the base to receive the camera. The cover covers the receiving space. The first electrical connection terminal is provided on the base. The first indicating light is provided on the cover and configured for emitting warning light. The second electrical connection terminal is provided on the cover and electronically coupled to the first indicating light. The second electrical connection terminal is electronically coupled with the first electrical connection terminal. The camera is received in the receiving space and used for electronically coupling to the first electrical connection terminal.

A rear view system includes a camera equipment and a display device. The camera equipment includes a camera housing device and a display device. The camera housing device includes a base, a cover, a first electrical connection terminal, a first indicating light, and a second electrical connection terminal. A receiving space is defined on the base to receive the camera. The cover is configured to cover the receiving space. The first electrical connection terminal is provided on the base. The first indicating light is provided on the cover and configured for emitting warning light. The second electrical connection terminal is provided on the cover and electronically coupled to the first indicating light. The second electrical connection terminal is electronically coupled with the first electrical connection terminal. The camera is received in the receiving space and used for electronically coupling to the first electrical connection terminal. The camera is received in the receiving space for capturing rear images of the riding equipment. The display device is installed on the riding equipment for displaying the rear images.

A camera equipment includes a camera housing device and a camera embedded in the camera housing device. A first indicating light is positioned on the camera housing device. The first indicating light includes a plurality of light units. A distance between an orthographic projection of each of the plurality of light units on a projection plane, and an orthographic projection of an optical axis of the camera on the projection plane, is greater than 15 mm (millimeter). The projection plane is perpendicular with the optical axis.

The first indicating light emits warning light for warning passers-by and/or vehicles behind the riding equipment. It may provide enough time for the passers-by and/or vehicles behind the riding equipment to avoid the riding equipment, reduce a possibility of collision accidents, and improve the safety of a user riding the riding equipment. The first electrical connection terminal is positioned on the base. The first indicating light and the second electrical connection terminal is positioned on the cover. In other words, the first electrical connection terminal, the second electrical connection terminal and the first indicating light are respectively mounted in two different portions, so that a light emitting area of the first indicating light may be increased and a layout flexibility of the camera housing device may be improved.

BRIEF DESCRIPTION OF THE DRAWINGS

In order to more clearly illustrate the technical solutions of the present disclosure, the accompanying drawings required for describing the embodiments will be briefly described below. Apparently, the accompanying drawings in the following description are merely the some embodiments of the present disclosure, and other drawings may be obtained by those skilled in the art according to these accompanying drawings without paying any creative labor.

FIG. 6b is a schematic diagram of orthographic projections of a first indicating light and a camera of the camera equipment shown in the FIG. 6a.

DETAILED DESCRIPTION

The following clearly describes the technical solutions in the embodiments of this disclosure with reference to the accompanying drawings in the embodiments of this disclosure.

An "electrically coupled" in this disclosure should be understood in a broad sense. For example, it can be an electrical connection directly connected, an electrical connection indirectly connected through an intermediate medium, or a connection within two elements.

A "communication with" in this disclosure may include a wired communication and a wireless communication.

Figure 1:
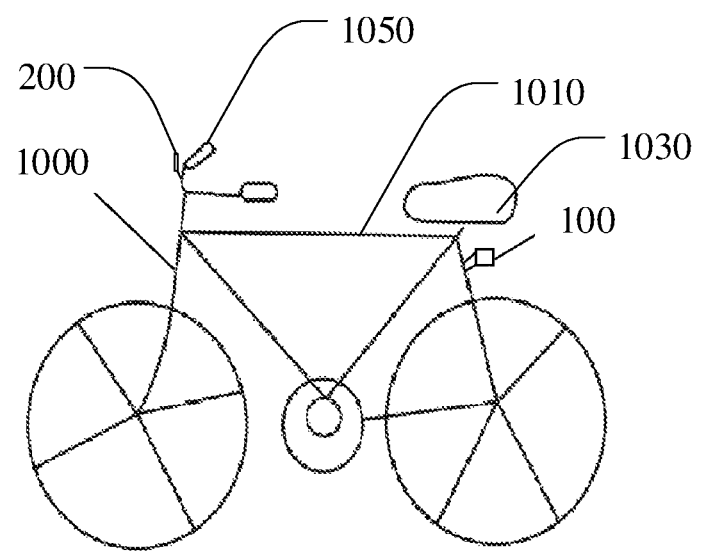
FIG. 1 is a schematic diagram of a rear system applied on a riding equipment according to one embodiment of the present disclosure.

Referring to FIG. 1, a rear view system applied on a riding equipment 1000 is provided in one embodiment. The riding equipment 1000 is a bicycle in the illustrated embodiment.

The riding equipment 1000 may include a frame 1010, a saddle 1030, and a handlebar 1050.

The saddle 1030 and the handlebar 1050 are positioned on the frame 1010.

The rear view system includes a camera equipment 100 and a display device 200.

The camera equipment 100 is mounted on the frame 1010 for capturing rear images of a rear view of the riding equipment 1000. The camera equipment 100 and the display device 200 are communicated with each other through a wireless communication module or a wired communication module. The camera equipment 100 is capable of capturing rear images and transmitting them to the display device 200 in real time. The display device 200 is mounted on the handlebar 1050 for displaying the rear images. The user may observe a rear road condition of the riding equipment 1000 via the rear images displayed in the display device 200. It is no need to look back for the user when riding. Thereby, it may improve the user's safety. In the illustrated embodiment, the display device 200 is a smart phone.

In other embodiments, the display device 200 may be other device, such as a mobile phone, a tablet computer, a desktop computer, a laptop computer, a handheld computer, an ultra-mobile personal computer, a netbook, an augmented reality wearable device, a virtual reality wearable device. It is no special restrictions on a specific type of the display device 200. For example, the display device 200 may be a pair of smart glasses. The smart glasses may be worn on a head of the user.

In other embodiments, the camera equipment 100 may be mounted on other portions of the riding equipment 1000 which may provide enough installation and rear view space for the camera equipment 100. For example, the camera equipment 100 may be mounted on a rigid member of the saddle 1030 (as shown in FIG. 1) for capturing rear images of the riding equipment 1000.

In other embodiments, the riding equipment 1000 may be other devices, such as a scooter, a motor bike, an electric balance vehicle (or sensor controlled vehicle or Segway), a wheel chair, a head set device (ex. a helmet for a user when riding).

Figure 2:
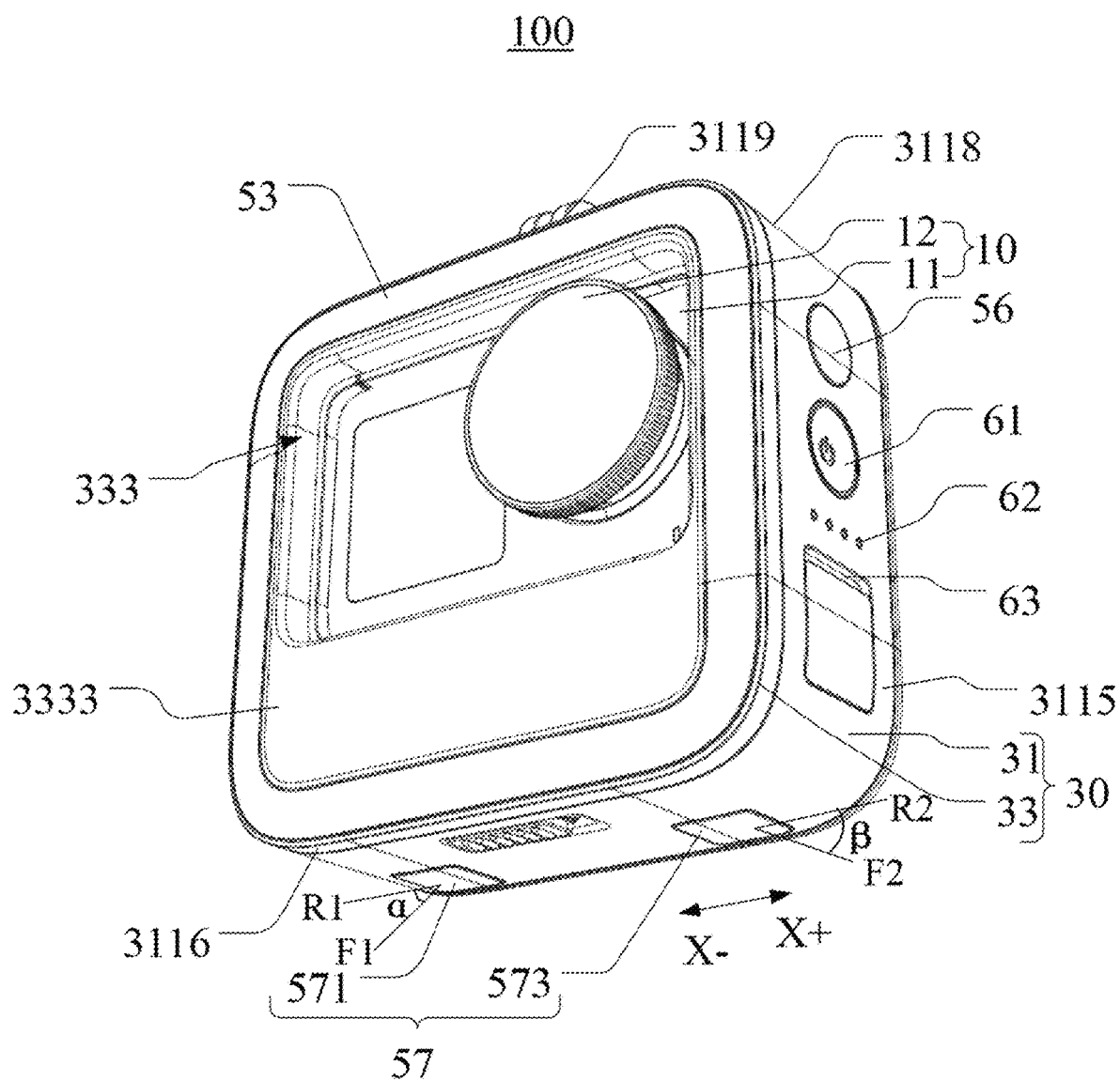
FIG. 2 is a schematic structural diagram of a camera equipment of the rear system according to one embodiment of the present disclosure.
Figure 3:
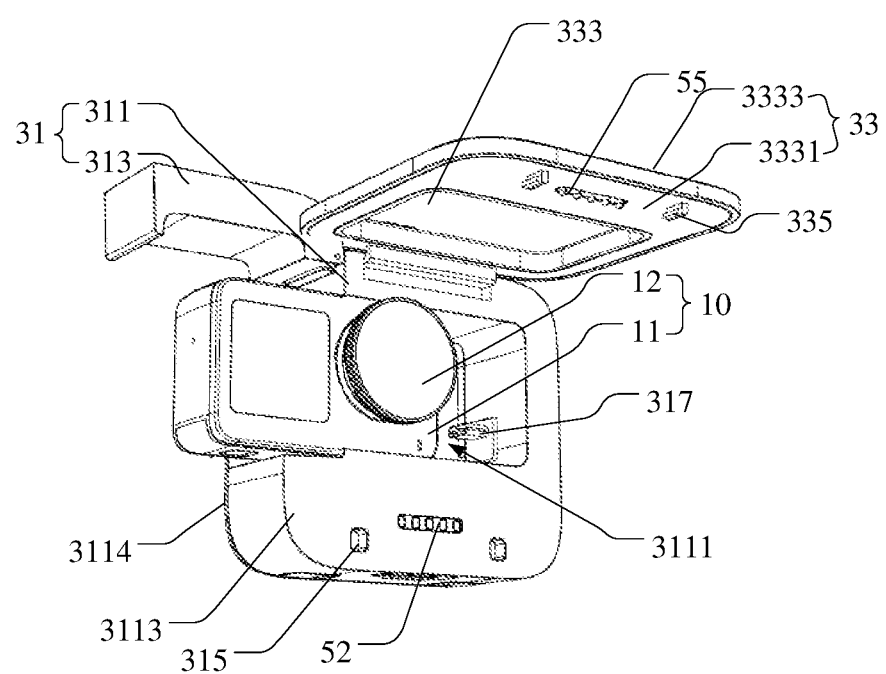
FIG. 3 is an exploded view of the camera equipment as shown in the FIG. 2.

Please referring to FIG. 2 and FIG. 3, the camera equipment 100 includes a camera 10 and a camera housing device 30. The camera 10 is mounted in the camera housing device 30. The camera 10 is detachably connected with the frame 1010 via the camera housing device 30. In other words, the camera 10 and the camera housing device 30 are in a detachable connection. A new camera 10 or a new camera housing device 30 can be directly replaced for convenience, when one of the camera 10 and the camera housing device 30 is damaged or needs to be replaced for other reasons.

Figure 4:
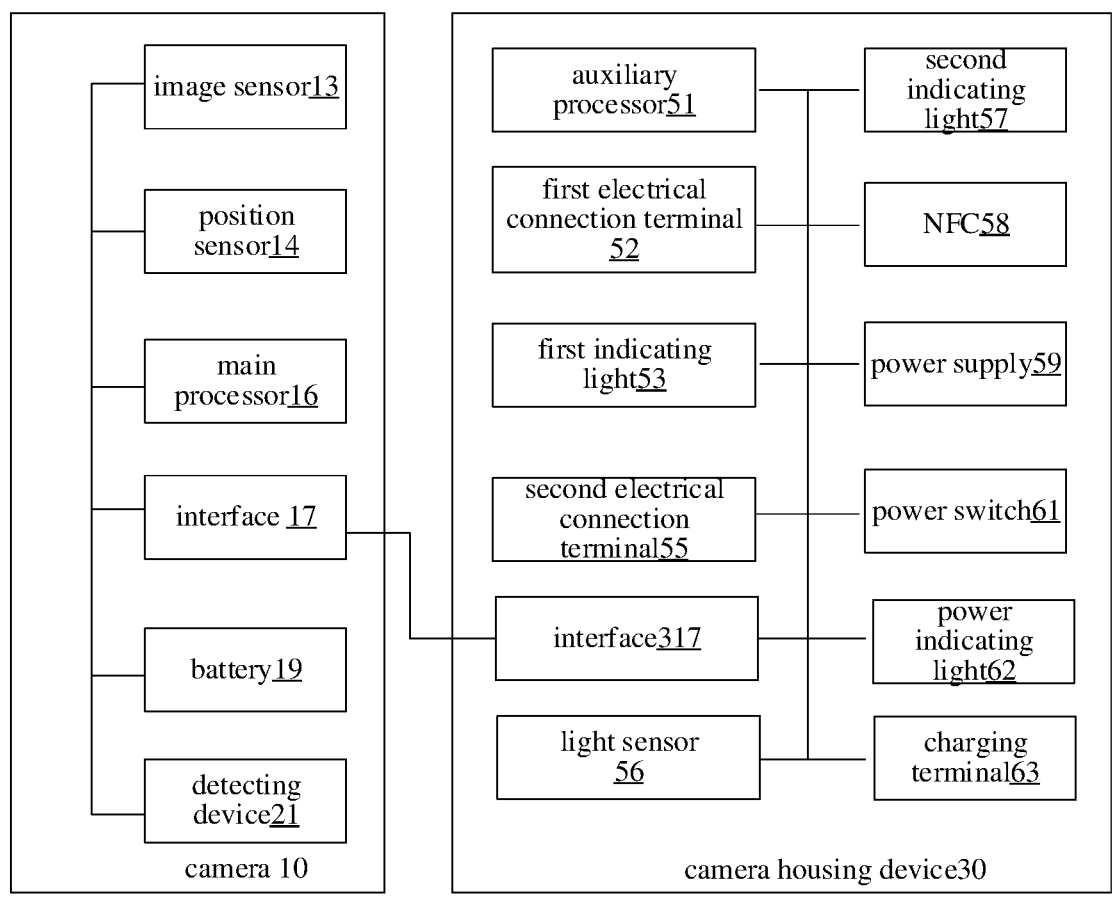
FIG. 4 is a block diagram of the camera equipment as shown in the FIG. 2 according to one embodiment of the present disclosure.

Please also referring to FIG. 3 and FIG. 4, the camera 10 includes a housing 11, an optical element 12, an image sensor 13, a position sensor 14, and a main processor 16. The optical element 12, the image sensor 13, the position sensor 14, and the main processor 16 are supported by the housing 11.

The optical element 12 may include instrument(s), tool(s), and/or medium that acts upon light passing through the instrument(s)/tool(s)/medium. For example, the optical element 12 may include one or more of lens, mirror, prism, and/or other optical elements. The optical element 12 may affect direction, deviation, and/or path of the light passing through the optical element 12. The optical element 12 may be configured to guide light within an optical field of view to the image sensor 13.

The image sensor 13 may include sensor(s) that converts received light into output signals. The output signals may include electrical signals. For example, the image sensor 13 may include one or more of a charge-coupled device sensor, an active pixel sensor, a complementary metal-oxide semiconductor sensor, an N-type metal-oxide-semiconductor sensor, and/or other image sensors. The image sensor 13 may generate output signals conveying information that defines one or more images (e.g., video frames of a video). For example, the image sensor 13 may be configured to generate an image output signal based on light that becomes incident thereon during capture duration. The image output signal may convey image information that defines images with the optical field of view.

The position sensor 14 is communicated with the main processor 16. The position sensor 14 is used for detecting motion information. The motion information is transmitted to the main processor 16 by the position sensor 14. The motion information may include direction, amount, velocity, acceleration information, and so on. The position sensor 14 may include sensor(s) that converts experienced positions/motions into output signals. The output signals may include electrical signals. For example, the position sensor 14 may refer to a set of position sensors, which may include one or more inertial measurement units, one or more accelerometers, one or more gyroscopes, and/or other position sensors. The position sensor 14 may generate output signals conveying information that characterizes positions of the position sensor 14 and/or device(s) carrying the position sensor 14. For example, the position sensor 14 may be configured to generate a position output signal based on positions of the camera 10 during the capture duration.

According to the motion information, the main processor 16 sends warning signal to the camera housing device 30, and enable the camera housing device 30 to emit warning light for warning the passers-by and/or vehicles who are behind of the riding equipment 1000. The warning light can be seen by eyes of people, such as the passers-by, and/or people in the vehicles. A pattern or texts may be formed by the warning light emitted by the camera housing device 30. The motion information indicates a running state of the riding equipment 1000.

The warning signal may include a deceleration warning signal. The warning light may include a deceleration warning light. The main processor 16 may be used for sending the warning signal to the camera housing device 30. The camera housing device 30 may be controlled by the camera 10 to emit the deceleration warning light, when the riding equipment 1000 is slow down. In other words, when the riding equipment 1000 is slow down, the camera housing device 30 can warn the passers-by and/or vehicles who are behind of the riding equipment 1000. Consequently, a possibility of accidents such as collision between passers-by and/or vehicles behind the riding equipment 1000 is reduced, and the safety of the user riding the riding equipment 1000 is improved.

The motion information obtained by the position sensor 14 may include acceleration information. The warning signal may include a first deceleration warning signal. The warning light may include a first deceleration warning light. On the condition that an acceleration change value of the camera 10 within a first predetermined time threshold exceeds a first change threshold, the main processor 16 may send a first deceleration warning signal. The riding equipment 1000 may be in an emergency deceleration (or emergency braking). In other words, the first deceleration warning signal may indicate that the riding device 1000 is in an emergency deceleration (or emergency braking) state. The camera housing device 30 may emit (emit) the first deceleration warning light.

In one embodiment, the warning signal may include second deceleration warning signal and a third deceleration warning signal. The warning light may include a second deceleration warning light and a third deceleration warning light. The second deceleration warning light may be different from the third deceleration warning light. The motion information obtained by the position sensor 14 may include acceleration information. On the condition that an acceleration change value of the camera 10 within a first predetermined time threshold exceeds a first change threshold but less than a second change threshold, the main processor 16 may send the second deceleration warning signal to the camera housing device 30. It means that the riding equipment 1000 is in a usual deceleration state. The camera housing device 30 emits the second deceleration warning light according to the second deceleration warning signal. The acceleration change value of the camera 10 within the first predetermined time threshold exceeds the second change threshold, the main processor 16 may send the third deceleration warning signal to the camera device 30. The third deceleration warning signal indicates that the riding equipment 1000 is in an emergency deceleration (or emergency braking) state. The camera housing device 30 controlled by the main processor 16 may emit the third deceleration warning light. The camera device 30 controlled by the main processor 16 can emit different warning light to warn passers-by and/or vehicles around or behind the riding equipment 1000, based on the different deceleration states of the riding equipment 1000.

In this illustrated embodiment, a brightness of the second deceleration warning light is less than a brightness of the third deceleration warning light. In other embodiments, a flicker frequency of the second deceleration warning light is less than a flicker frequency of the third deceleration warning light.

The warning signal further includes a turning warning signal. The warning light further includes a turning warning light. According to the motion information, the main processor 16 sends the turning warning signal to enable the camera housing device 30 to emit a turning warning light. In other words, the camera housing device 30 can indicate that the riding equipment 1000 is in a turn.

The motion information further includes acceleration information and attitude information. The turning warning signal includes a first turning warning signal and a second turning warning signal. The turning warning light may include first turning warning light and second turning warning light. An angle change value within a second predetermined time threshold obtained by the main processor 16 is greater than a first angle threshold, according to the acceleration information. The main processor 16 may determine a turning direction of the riding equipment 1000 according to a tilt direction of the attitude information. The turning direction may include a first turning (ex. left turning) and a second turning (ex. right turning). When the main processor 16 determines that the riding equipment 1000 is in a turn with the first turning direction, the first turning warning signal is sent to the camera housing device 30 by the main processor 16. The first turning warning light may be emit by the camera housing device 30 when receiving the first turning warning signal. When the main processor 16 determines that the riding equipment 1000 is in a turn with the second turning direction, the second turning warning signal is sent to the camera housing device 30 by the main processor 16. The second turning warning light may be emitted by the camera housing device 30 when receiving the second turning warning signal.

In one embodiment, the turning warning signal may include a usual turning warning signal and a sharp turning warning signal. The turning warning light may include usual turning warning light and sharp turning warning light. The usual turning warning light is different from the sharp turning warning light. When the angle change value within a second predetermined time threshold obtained by the position sensor 14 is greater than a second angle threshold but less than a third angle threshold, the main processor 16 determines that the riding equipment 1000 is running on a usual turn The usual turning warning signal may be sent to the camera housing device 30 by the main processor 16. The usual turning warning light may be emitted by the camera housing device 30. When the angle change value within a second predetermined time threshold obtained by the position sensor 14 is greater than the third angle threshold, the main processor 16 determines that the riding equipment 1000 is running on a sharp turn. The sharp turning warning signal may be sent to the camera housing device 30 by the main processor 16. The sharp turning warning light may be emitted by the camera housing device 30. It is because the camera housing device 30 can emit different turning warning light when the riding equipment 1000 running in different turns, that the passers-by and/or vehicles around the riding equipment 1000 can be better warned or reminded.

In the illustrated embodiment, a brightness of the usual turning warning light is less than a brightness of the sharp turning warning light, and/or a flicker frequency of the usual turning warning light is less than a flicker frequency of the sharp turning warning light. In other embodiments, a color of the usual turning warning light may be different from a color of the sharp turning warning light.

In detail, the usual turning warning signal includes a first usual turning warning signal and a second usual turning warning signal. The sharp turning warning signal includes a first sharp turning warning signal and a second sharp turning warning signal. The usual turning light includes first usual turning light and second usual turning light. The sharp turning light includes first sharp turning light and second sharp turning light. When the angle change value within a second predetermined time threshold obtained by the position sensor 14 is greater than a second angle threshold but less than a third angle threshold, the main processor 16 may determine that the riding equipment 1000 is running on the usual turn. The main processor 16 may determine the turning direction of the riding equipment 1000 running in the usual turning, according to a tilt direction of the attitude information. The main processor 16 may determine that the turning direction is the first turning when the riding equipment 1000 running in the usual turning, the first usual turning warning signal may be sent to the camera housing device 30 by the main processor 16. The first usual turning warning light may be emitted by the camera housing device 30 when receiving the first usual turning warning signal. The main processor 16 may determine that the turning direction is the second turning when the riding equipment 1000 running in the usual turn, the second usual turning warning signal may be sent to the camera housing device 30 by the main processor 16. The second usual turning warning light may be emitted by the camera housing device 30 when receiving the second usual turning warning signal.

When the angle change value within the second predetermined time threshold obtained by the position sensor 14 is greater than the third angle threshold, the main processor 16 determines that the riding equipment 1000 is running on the sharp turn. The main processor 16 determines that the turning direction of the riding equipment 1000 running in the sharp turn, according to a tilt direction of the attitude information. The main processor 16 determines that the turning direction is the first turning when the riding equipment 1000 running in the sharp turn, the first sharp turning warning signal may be sent to the camera housing device 30 by the main processor 16. The first sharp turning warning light may be emitted by the camera housing device 30 when receiving the first sharp turning warning signal. The main processor 16 may determine that the turning direction is the second turning when the riding equipment 1000 running in the sharp turn, the second sharp turning warning signal may be sent to the camera housing device 30 by the main processor 16. The second sharp turning warning light may be emitted by the camera housing device 30 when receiving the second sharp turning warning signal.

The main processor 16 is shown as a single component in FIG. 4, but it is just for illustrative purposes only. The main processor 16 may include one or more processors (logic circuitry) that provide information processing capabilities in the camera 10. The main processor 16 may provide one or more computing functions for the camera 10. The main processor 16 may operate/send command signals to one or more components of the camera 10 to operate the camera 10. For example, the main processor 16 may facilitate operation of the camera 10 in capturing image(s) and/or video(s), facilitate operation of the optical element 12 (e.g., change how light is guided by the optical element 12), and/or facilitate operation of the image sensor 13 (e.g., change how the received light is converted into information that defines images/videos and/or how the images/videos are post-processed after capture).

The main processor 16 may include memory, such as a random-access memory device (RAM), flash memory, or another suitable type of storage device such as a non-transitory computer-readable memory. The memory of the main processor 16 may include executable instructions and data that can be accessed by one or more processors of the main processor 16.

For example, the main processor 16 may include one or more dynamic random access memory (DRAM) modules, such as double data rate synchronous dynamic random-access memory (DDR SDRAM). In some implementations, the main processor 16 may include a digital signal processor (DSP). In some implementations, the main processor 16 may include an application specific integrated circuit (ASIC). For example, the main processor 16 may include a custom image signal processor.

The camera 10 may further include an interface 17 electrically coupled to the main processor 16. The interface 17 may be used for electrically coupled with the camera housing device 30 for transmitting information or signal. In other embodiments, the camera 10 may further include other interfaces, such as a communication interface for transmitting images to others devices, a user interface for controlling capturing and/or watching images.

The camera 10 may further include a battery 19 to power the camera 10.

Portions of the camera 10 may communicate each other via a bus (not shown).

The camera housing device 30 includes a base 31 and a cover 33. The base 31 is detachably mounted on the frame 1010 of the riding equipment 1000 for supporting the camera 10. The cover 33 may be rotatably connected with the base 31 for protecting the camera 10.

The base 31 includes a main body 311 and a snap portion 313. A receiving space 3111 is defined on the main body 311 for receiving the camera 10. The cover 33 is used for covering on the receiving space 3111. A first end of the snap portion 313 is rotatably connected with the main body 311 via a rotation shaft. The second end of the snap portion 313 is configured to be engaged with the main body 311, for preventing the camera 10 from detaching the base 31. When the second end of the snap portion 313 is separated from the main body 311, the main body 311 forms an opening (not marked in the figure) connecting to the receiving space 3111. The camera 10 can slide into the receiving space 3111 through the opening of the main body 311. In other embodiments, the snap portion 313 may be detachably connected to the main body 311.

It may be convenient to assemble the camera 10 on the base 31 or disassemble the camera 10 from the base 31, because of a snap connection between the main body 311 and the snap portion 313. In addition, the snap portion 313 and the main body 311 can connect together and form a ring structure to around the camera 10, for protecting the camera 10. In other embodiments, a shock-absorbing structure for the camera 10 may be positioned on the base 31 to reduce vibrations of the camera 10.

In other embodiments, the base 31 and the cover 311 may be connected with each other without a rotation shaft. The base 31 and the cover 311 may connected with each other via others connections, such as a snap connection, a threaded connection.

In other embodiments, the snap portion 313 may be omitted. The camera 10 may be fixed on the base 31 in others ways. In one embodiment, the housing 11 of the camera 10 may include a first engagement portion and a second engagement portion positioned on an inner wall of the receiving space 3111. One of the first engagement portion and the second engagement portion may be an elastic protrusion, another one of the first engagement portion and the second clamping may be a clamping hole for engaging with the elastic protrusion. The elastic protrusion is received in the clamping hole when the camera 10 is installed in a predetermined position of the base 31.

The main body 311 includes a first surface 3113 (as shown in FIG. 3), a second surface 3114 (as shown in FIG. 3), and a side surface 3115 (as shown in FIG. 2). The first surface 3113 is oppositely positioned to the second surface 3114. The receiving space 3111 is defined through the first surface 3113 and the second surface 3114. The receiving space 3111 may be a through hole or groove. A first end of the side surface 3115 is connected to the first surface 3113. A second end of the side surface 3115 is connected to the second surface 3114. The first surface 3113 faces towards the cover 33, when the cover 33 covers on the base 31. In other embodiments, the receiving space 3111 may be a groove, which defines through the first surface 3113 but not through the second surface 3114. A first locking portion 315 may be positioned on the first surface 3113 for engaging with the cover 33.

The cover 33 is rotatably connected with the main body 311. The cover 33 may be opened and closed on the main body 311. The cover 33 can be flipped relatively to the base 31 when a user (including the rider) needs to operate the camera 10 received in the receiving space 3111. A using convenience of the camera housing 30 and the camera equipment 100 may be improved.

A hollow-out area 333 is defined on the cover 33. A position of the hollow-out area 333 corresponds to a position of the optical element 12 when the camera 10 received in the receiving space 3111, for facilitating the user to operate the optical element 12 and other elements of the camera 10. The cover 33 may be made of a kind of non-transparent material. The cover 33 includes a third surface 3331 and a fourth surface 3333 opposite to the third surface 3331. The third surface 3331 faces towards the first surface 3113. Light can enter the receiving space 3111 through the hollow-out area 333. In other embodiments, the hollow-out area 333 can be omitted when the cover 33 is made of light transmitting material.

The cover 33 further includes a second engagement portion 335 positioned on the third surface 3331. The first engagement portion 315 is connected with the second engagement portion 335 for avoiding a detachment of the cover 33 from the base 31, when the cover 33 covers the receiving space 3111.

In the illustrated embodiment, the first engagement portion 315 may be an engagement hole recessed on the first surface 3113. The second engagement portion 335 may be a buckle protruding on the third surface 3331. The buckle can be received in and engaged with the engagement hole.

In other embodiments, a position of the first engagement portion 315 may be positioned on other portions of the base 31d, and a position of the second engagement portion 335 may be positioned on other portions of the cover 33. One of the first engagement portion 315 and the second engagement portion 335 may be an engagement hole, and another one of the first engagement portion 315 and the second engagement portion 335 may be a buckle for engaging with the engagement hole.

The camera housing device 30 further includes an auxiliary processor 51, a first electrical connection terminal 52, a first indicating light 53, and a second electrical connection terminal 55.

The auxiliary processor 51 is received in the main body 311 of the base 31. The auxiliary processor 51 is electrically coupled with the camera 10 received in the receiving space 3111 of the base 31. The first electrical connection terminal 52 is positioned on the first surface 3113. The first electrical connection terminal 52 is electrically coupled with the auxiliary processor 51. The second electrical connection terminal 55 is positioned on the third surface 3331. The first indicating light 53 is positioned on the fourth surface 3333. The second electrical connection terminal 55 is electrically coupled with the first indicating light 53. The second electrical connection terminal 55 is electrically coupled with the first electrical connection terminal 52 when the cover 33 covers on the receiving space 3111 of the base 31. In the illustrated embodiments, the first electrical connection terminal 52 is a male base of a pogo pin connector, and the second electrical connection terminal 55 is a female base of the pogo pin. In other embodiments, a type of the connector is not limited, the first electrical connection terminal 52 and the second electrical connection terminal 55 can be electronically coupled with each other via a physical contact or connection.

The auxiliary processor 51 is used for controlling the first indicating light 53 to emit the warning light for warning the passers-by and/or vehicles around the riding equipment 1000, when receiving the warning signal sent by the camera 10. Thus, a possibility of collisions accidents between the riding equipment 1000 and the passers-by and/or vehicles around the riding equipment 1000. The safety of the user riding the riding equipment 1000 may be improved. In addition, the first electrical connection terminal 52 is positioned on the base 31, and the first indicating light 53 and the second electrical connection terminal 55 are positioned on the cover 30. A light emitting area of the first indicating light 53 may be increased and a layout flexibility of the camera housing device 30 may be improved.

The auxiliary processor 51 is shown as a single component in FIG. 4, but it is just for illustrative purposes only. The auxiliary processor 51 may include one or more processors (logic circuitry) that provide information processing capabilities in the camera housing device 30. The auxiliary processor 51 may provide one or more computing functions for the camera housing device 30. The auxiliary processor 51 may operate/send command signals to one or more components of the camera housing device 30 to operate the camera housing device 30.

The auxiliary processor 51 may include memory, such as a random-access memory device (RAM), flash memory, or another suitable type of storage device such as a non-transitory computer-readable memory. The memory of the auxiliary processor 51 may include executable instructions and data that can be accessed by one or more processors of the auxiliary processor 51.

For example, the auxiliary processor 51 may include one or more dynamic random access memory (DRAM) modules, such as double data rate synchronous dynamic random-access memory (DDR SDRAM). In some implementations, the auxiliary processor 51 may include a digital signal processor (DSP). In some implementations, the auxiliary processor 51 may include an application specific integrated circuit (ASIC). For example, the auxiliary processor 51 may include a custom image signal processor.

In the illustrated embodiment, an interface 317 (as shown in FIG. 3) protrudes from an inner wall of the receiving space 3111. The interface 317 is oppositely positioned to the snap portion 313, when the second end of the snap portion 313 is engaged with the main body 311. The interface 317 is docked to the interface 17 of the camera 10 when the camera 10 slides into the receiving space 3111 and reach a predetermined position. Then the auxiliary processor 51 is electrically coupled with the main processor 16. A wire trace structure may be simplified, it is because the interface 317 protruded from the inner wall of the receiving space 3111 that the interface 17 and the interface 317 may be directly and electrically coupled each other without any electrical wire exposed out of the camera housing device 30. It may be no need to plug a wire for electrical connection between the camera 10 and the camera housing device 30, when the camera 10 slides into the base 31. Thus, an assembly of the camera equipment 100 may be simplified, and an efficiency of assembly of the camera equipment 100 may be improved.

Figure 5:
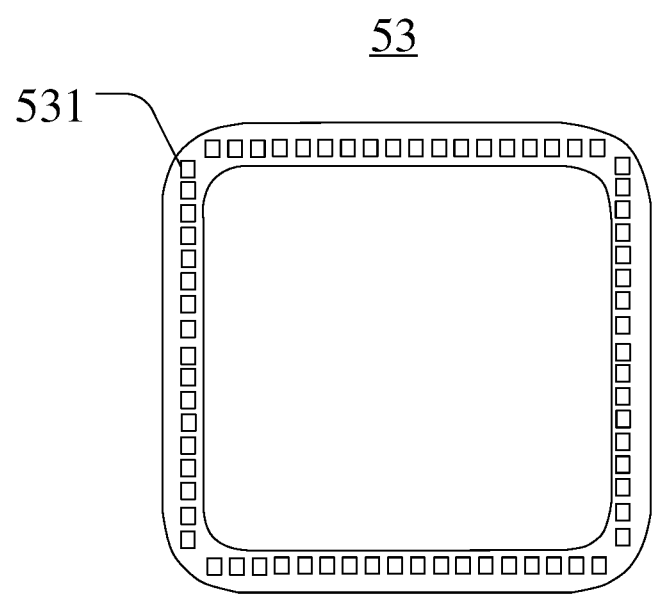
FIG. 5 is a schematic diagram of a first indicating light of the camera equipment as shown in the FIG. 2.

In the illustrated embodiments, the camera 10 is surrounded by the first indicating light 53. The first indicating light 53 forms a ring-shaped structure along an edge of the fourth surface 3333. The first indicating light 53 may emit the warning light, based on the warning signal sent by the auxiliary processor 51. The warning light may be shined or flashed by the first indicating light 53. Please referring to FIG. 5, the first indicating light 53 includes a plurality of light units 531. According to the warning signal, the auxiliary processor 51 controls a part (e.g. at least one) of the light units 531 to shine or flash for emitting the warning light.

The auxiliary processor 51 may control the first indicating light 53 to emit the first deceleration warning light when receiving the first deceleration warning signal. All or a part of the light units 531 shine or flash to form the first deceleration warning light. The first deceleration warning light can warn the passers-by and vehicles behind the riding equipment 1000 when the riding equipment 1000 is slow down.

In one embodiment, the auxiliary processor 51 may control the first indicating light 53 to emit the second deceleration warning light when receiving the second deceleration warning signal sent by the main processor 16. The second deceleration warning light indicates that the riding equipment 1000 is in the usual deceleration. The auxiliary processor 51 controls the first indicating light 53 to emit the third deceleration warning light when receiving the third deceleration warning signal sent by the main processor 16. The third deceleration warning light indicates that the riding equipment 1000 is in the emergency deceleration. A brightness of the second deceleration warning light is less than a brightness of the third deceleration warning light for better warn the passes-by and/or vehicles around the riding equipment 1000 when the riding equipment 1000 is in the emergency deceleration.

In order to enable the brightness of the second deceleration warning light to be less than a brightness of the third deceleration warning light, all of the light units 531 shine with a first brightness level when the first indicating light 53 sending out the second deceleration warning light, and all of the light units 531 shine with a second brightness level when the first indicating light 53 sending out the third deceleration warning light. The first brightness level is less than the second brightness level.

In other embodiments, the number of the light units 531 emitting light when the first indicting light 53 sending out the second deceleration warning light, may be less than the number of the light units 531 emitting light when the first indicting light 53 sending out the third deceleration warning light, so as to enable the brightness of the second deceleration warning light to be less than a brightness of the third deceleration warning light.

In other embodiments, the brightness of the second deceleration warning light emitted by the first indicating light 53 is less than the brightness of the third deceleration warning light emitted by the first indicating light 53. In some embodiments, a color (e.g. red) of the second deceleration warning light may be different from a color (e.g. red) of the third deceleration warning light. In some embodiments, the licker frequency of the second deceleration warning light emitted by the first indicating light 53 is less than the licker frequency of the third deceleration warning light emitted by the first indicating light 53. In other words, the flicker frequency of the second deceleration warning light may be less than the flicker frequency of the third deceleration warning light.

The auxiliary processor 51 may control the first indicating light 53 to emit the first turning warning light when receiving the first turning warning signal, for warning the passes-by and/or vehicles around the riding equipment 1000 that the riding equipment 1000 is in a turn with the first turning direction. The auxiliary processor 51 may control the first indicating light 53 to emit the second turning warning light when receiving the second turning warning signal, for warning the passes-by and/or vehicles around the riding equipment 1000 that the riding equipment 1000 is in a turn with the second turning direction. A part of the light units 531 may form a first turning direction pattern (e.g. a left arrow) when the first indicating light 53 emitting the first turning warning light. A part of the light units 531 may form a second turning direction pattern (e.g. a right arrow) when the first indicating light 53 emitting the first turning warning light. In other embodiments, the pattern formed by the first indicating light 53 when emitting the first turning warning light may be in other forms (e.g. shapes), and the pattern formed by the first indicating light 53 when emitting the first turning warning light may be in other forms (e.g. shapes). A shape of the pattern formed by the first indicating light 53 may be a cycle, or a square.

In other embodiments, the auxiliary processor 51 may control the first indicating light 53 to emit the usual turning warning light when receiving the usual turning warning signal. The auxiliary processor 51 controls the first indicating light 53 to emit the sharp turning warning light when receiving the sharp turning warning light. The brightness of the usual turning warning light is less than the brightness of the sharp turning warning light. And/or, the flicker frequency of the usual turning warning light is less than the flicker frequency of the sharp turning warning light. The camera housing device 30 can emit different light according to the riding equipment 1000 in the usual turn or the sharp turn for better warning the passers-by and/or vehicles around the riding equipment 1000.

The auxiliary processor 51 may control the first indicating light 53 to emit the first usual turning warning light when receiving the first usual turning warning signal. The auxiliary processor 51 may control the first indicating light 53 to emit the second usual turning warning light when receiving the second usual turning warning signal. The auxiliary processor 51 may control the first indicating light 53 to emit the first sharp turning warning light when receiving the first sharp turning warning signal.

In other embodiments, the brightness of the usual turning warning light may be not less than the brightness of the sharp turning warning light. In other embodiments, a color of the usual turning warning light (e.g. yellow) is different from a color (e.g. red) of the sharp turning warning light.

It may be easy to happen that collision accident between the passes-by and/or vehicles and the riding equipment, when the user riding the riding equipment without warning light in an environment with low ambient brightness, such as, riding in an evening or a tunnel. In the illustrated embodiment, the camera housing device 30 further includes a light sensor 56 (as shown in FIG. 2 and FIG. 4) positioned on the side surface 3115 of the main body 311. The light sensor 56 is electrically coupled with the auxiliary processor 51. The light sensor 56 is used for detecting an ambient brightness of the camera housing device 30 and feedback the auxiliary processor 51. The auxiliary processor 51 compares the ambient brightness obtained by the light sensor 56 with a predetermined brightness threshold. The auxiliary processor 51 determines that the camera housing device 30 is in a low brightness environment, on the condition that the ambient brightness obtained by the light sensor 56 is less than the predetermined brightness threshold. The auxiliary processor 51 sends a first starting signal to start the first indicating light 53 to emit light, on the condition that the auxiliary processor 51 determines that the ambient brightness obtained by the light sensor 56 is less than a predetermined brightness threshold. The first indicating light 53 may shine or flash. The camera housing device 30 automatically shines or flashes for warning the passers-by and/or vehicles, when the light sensor 56 detects that the riding equipment 1000 is in a low ambient brightness environment. Thus, a safety of the user riding in the low ambient brightness environment may be improved. In order to better warn the passers-by and/or vehicles in the low ambient brightness environment, the brightness of the warning light emitted by the first indicating light 53 according to the warning signal is greater than a brightness of the light emitted by the first indicating light 53 according to the first starting signal. And/or a flicker frequency of the warning light emitted by the first indicating light 53 according to the warning signal, is greater than a flicker frequency of the light emitted by the first indicating light 53 according to the first starting signal. The warning signal includes the first deceleration warning signal, the second deceleration warning signal, the first sharp turning warning signal, the second sharp turning warning signal, the first usual turning warning signal, and the second usual turning warning signal. The auxiliary processor 51 determines that the environment of the camera housing device 30 is a high brightness environment, on the condition that the ambient brightness obtained by the light sensor 56 is not less than the predetermined brightness threshold.

A position of the light sensor 56 on the camera equipment 100 is not limited. In other embodiments, the light sensor 56 can be positioned on the camera 10.

In other embodiment, the brightness of the warning light emitted by the first indicating light 53 according to the warning signal may not less than a brightness of the light emitted by the first indicating light 53 according to the first starting signal. In other embodiments, the brightness of the warning light emitted by the first indicating light 53 according to the warning signal is not less than a brightness of the light emitted by the first indicating light 53 according to the first starting signal.

In the illustrated embodiment, the camera housing device 30 further includes a second indicating light 57(as shown in FIG. 2 and FIG. 4) positioned a bottom of the base 31. The second indicating light 57 is communicated with the auxiliary processor 51. The auxiliary processor 51 sends a second starting signal to start the second indicating light 57 to emit light, on the condition that the ambient brightness obtained by the light sensor 56 is less than the predetermined brightness threshold. The second indicating light 57 is used for warning the passes-by and/or vehicles around the riding equipment 1000. A possibility of accidents between the riding equipment 1000 and the passes-by and/or vehicles may be reduced, such as a scraping, a collision.

The main body 311 further includes a bottom surface 3116 positioned on the bottom of the main body 311. The bottom surface 3116 is fixed to the side surface 3115. The bottom surface 3116 is connected between the first surface 3113 and the second surface 3114. The second indicating light 57 is positioned on the bottom surface 3116. The second indicating light 57 includes a first laser module 571 and a second laser module 573. The first laser module 571 and the second laser module 573 are positioned on the bottom surface 3116 and spaced from each other to avoid affecting the camera 10 when capturing the rear images. A distance between the first laser module 571 and the second laser module 573 is greater than 40 mm and less than 80 mm for reducing a interference between the first laser module 571 and the second laser module 573. In other words, the distance is in a range of [40, 80] mm.

The first laser module 571 includes a first emitting surface. The second laser module 573 includes a second emitting surface. A first angle α between a first normalline F1 of the first emitting surface and a negative direction R1 of a reference direction X is greater than 0° but less than 15°. A second angle β between a second normalline F2 of the second emitting surface and a positive direction R2 of the reference direction X is greater than 0° but less than 15°. Consequently, it may more decrease the interference between the first laser module 571 and the second laser module 573. In the illustrated embodiment, the interface 17 of the camera 10 and the interface 317 can be plugged together along the reference direction. The first laser module 571 and the second laser module 573 are arranged along the reference direction and spaced from each other. In other embodiments, the interface 17 of the camera 10 and the interface 317 may be plugged together along other direction but not the reference direction. The second warning light 57 may be not lasers. The distance between the first laser module 571 and the second laser module 573 may be out the range of the [40, 80] mm. The first angle may be out of the range which is greater than 0° but less than 15°. The second angle may be out of the range which is greater than 0° but less than 15°.

The main body 311 further includes a top surface 3118 positioned on a top of the main body 311. The top surface 3118 is oppositely positioned to the bottom surface3116. The side surface 3115 is connected between the top surface 3118 and the bottom surface3116. A fixing buckle 3119 protrudes from the top surface 3118 for fixing with the frame 1010.

The camera 10 includes a non-riding mode and a riding mode. When the camera 10 is not assembled on the riding equipment 1000, the camera 10 may work in the non-riding mode, because of a weak shaking. When the camera 10 is assembled on the riding equipment 1000, the camera 10 may work in the riding mode for capturing high quality images. It is because that a motion of the riding equipment 1000 may bring a strong shaking. The camera housing device 30 further includes a near field communication (NFC) chip 58 positioned on the second end of the snap portion 313. The camera housing device 30 further includes a detecting device 21 for detecting the near field communication chip 58.

A distance between the camera 10 and the near field communication chip 58 is less than a predetermined distance threshold, when the camera 10 slides into the receiving space 3111 and reaches the predetermined position. The second end of the snap portion 313 is engaged with the main body 311 after the camera 10 sliding into the receiving space 3111. If the distance between the camera 10 and the near field communication chip 58 is less than the predetermined distance threshold, an indicating signal may be generated by the detecting device 21 of the camera 10. It means that the camera 10 is installed on the predetermined position of the camera housing device 30. The indicating signal may be also used for instructing the camera 10 switch into the riding mode. The indicating signal may be transmitted to the main processor 16. The main processor 16 may control the camera 10 to switch into the riding mode from the non-riding mode according to the instruction signal. The camera 10 can automatically enter the riding mode to capture images without manual operation, when the distance between the camera 10 and the near field communication chip 58 is less than the predetermined distance threshold. The use convenience of the camera equipment 100 may be improved.

The camera housing device 30 further includes a power supply 59 received in the main body 311. The power supply 59 is electrically coupled with the auxiliary processor 51. The camera 10 and members (including the first indicating light 53, the auxiliary processor 51, and the second indicating light 57) of the camera housing device 30 are powered by the power supply 59. The power supply 59 may be a rechargeable battery or a non-rechargeable battery. A battery mode (size) of the power supply 59 may be chosen from 18650 and 21700. In other embodiments, the battery mode of the power supply 59 may be others.

The camera housing device 30 further includes a power switch 61 for starting the power supply 59. In other embodiments, the power switch 61 may be positioned on other portions of the camera housing device 30. For example, the power switch 61 may be positioned on the top surface 3118 or the second surface 3114.

The camera housing device 30 further includes a power indicating light 62 positioned on the side surface 3115. The power indicating light 62 is electrically coupled with the power supply 59. The power indicating light 62 is used for indicating a status of the power supply 59. In other embodiments, the power indicating light 62 may be positioned on other portions of the camera housing device 30. For example, the indicating light 62 may be positioned on the top surface 3118 or the second surface 3114.

The camera housing device 30 may further include a charging terminal 63 positioned on the side surface 3115 for charging the power supply 59. In other embodiments, the charging terminal 63 may be positioned on other portions of the camera housing device 30. For example, charging terminal 63 may be positioned on the top surface 3118 or the second surface 3114.

The first indicating light 53 is controlled to emit warning light according to the received warning signal sent by the camera 10. It may reduce an occurrence of accidents (including collisions and scrapings), and improve the riding safety of the user when riding the riding device 1000.

Figure 6A:
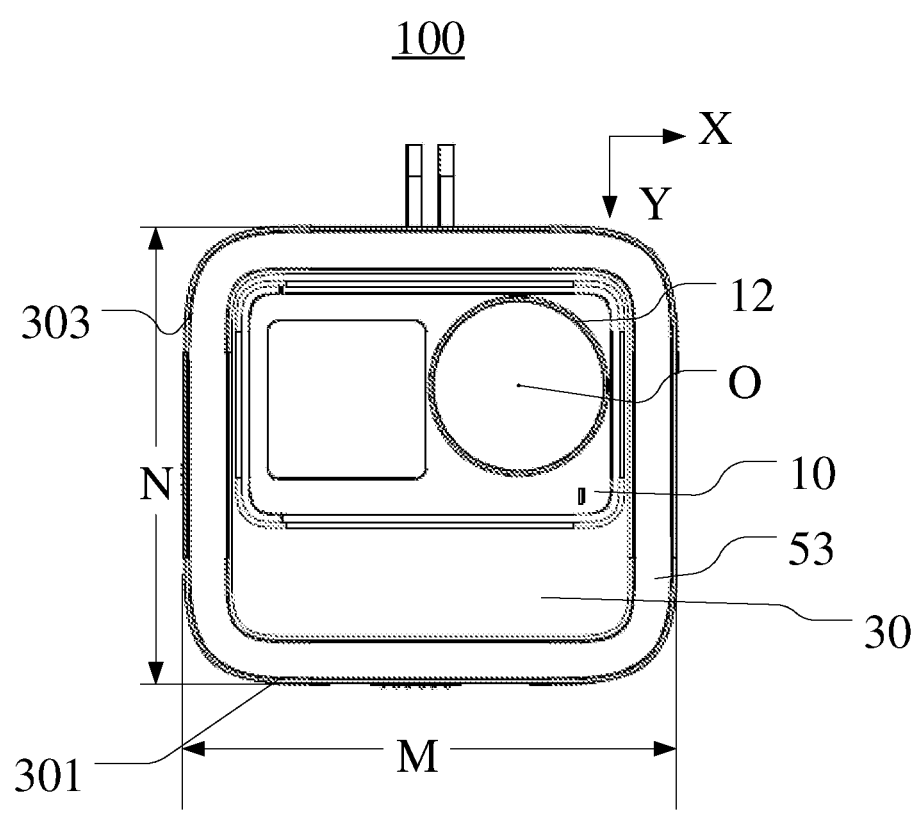
FIG. 6a is a front view of a camera equipment according to one embodiment of the present disclosure.

Referring to FIG. 6a, a camera equipment 100 is provided in one embodiment, that the camera 10 is integrated with the camera housing device 30. In other words, the camera 10 is embodied in the camera housing device 30 to simplify a structure of the camera equipment 100.

Figure 6B:
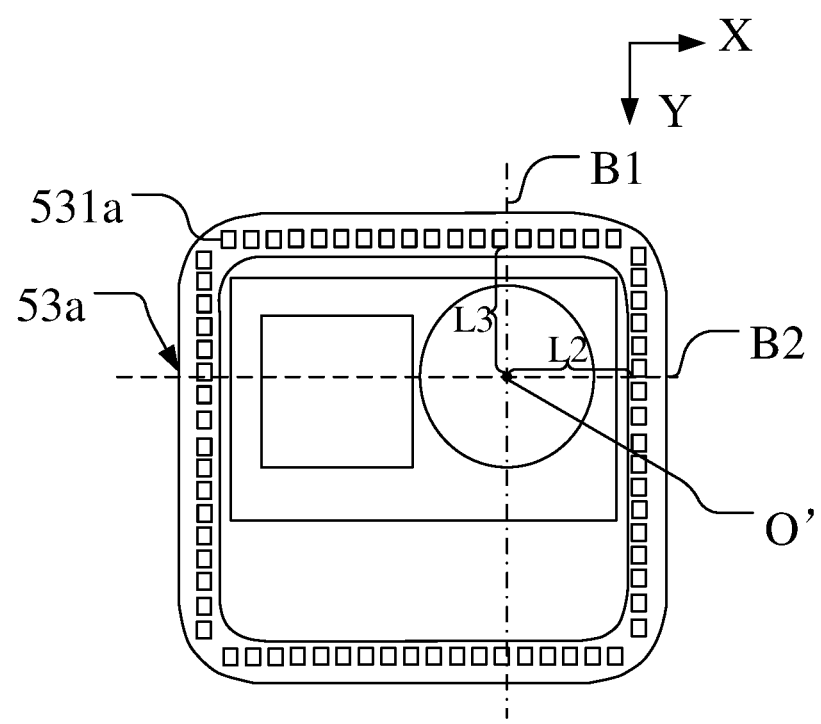
Figure 7:
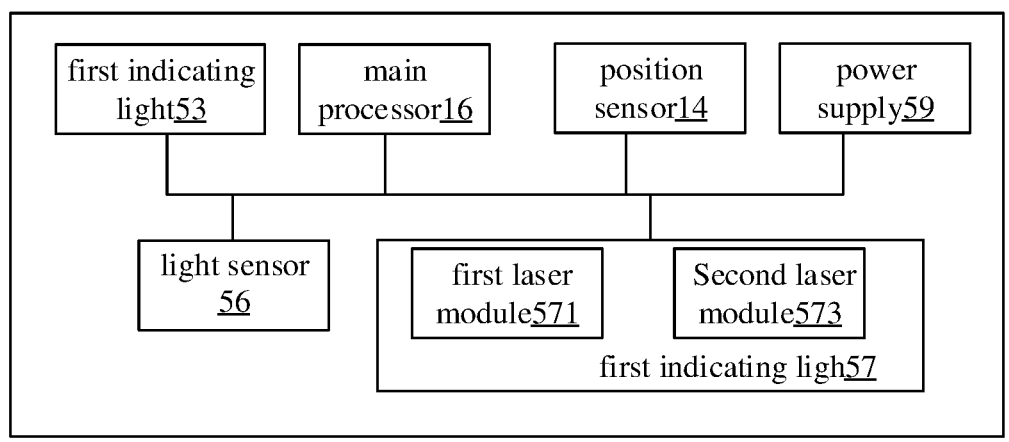
FIG. 7 is a block diagram of the camera equipment as shown in the FIG. 6*a* according to one embodiment of the present disclosure.

A first indicating light 53 is positioned on the camera housing device 30. An optical element 12 is positioned on the camera 10. Please also referring to FIG. 6b, FIG. 6b is a schematic diagram of orthographic projections of a first indicating light and a camera of the camera equipment shown in the FIG. 6a. An orthographic projection of the first indicating light 53 on the projection plane is defined as an orthographic projection 53a. The first indicating light 53 includes a plurality of light units. An orthographic projection of a light unit on the projection plane is defined as an orthographic projection 531a. The orthographic projection of the optical element 12 on the projection plane is defined as an orthographic projection O'. A distance between the orthographic projection 531a of each of the plurality of light units on the projection plane, and the orthographic projection O' of the optical axis O of the optical element 12 of the camera 10 on the projection plane, is greater than 15 mm. The projection plane is perpendicular to the optical axis O. In the illustrated embodiment, the distance between the orthographic projection 531a of each of the plurality of light units on the projection plane, and the orthographic projection O' of the optical axis of the optical element 12 of the camera 10 on the projection plane, may be less than 30 mm. In one embodiment, the distance between the orthographic projection 531a of each of the plurality of light units on the projection plane, and the orthographic projection O' of the optical axis of the optical element 12 of the camera 10 on the projection plane, is greater than 15 mm but less than nine out ten (9/10) of a length of the longest edge of the camera housing device 30. A possibility of an emitting light range of the first indicating light 53 overlapping with an imaging angle of the optical element 12 may be reduced. A possibility of an interference caused by the first warning light 53 to the imaging of the optical element 12 may be also reduced to improve an imaging quality of the camera 10.

In the illustrated embodiment, the camera equipment 100 is in a rectangular shape. The camera housing device 30 includes a first edge 301 and a second edge 303. The first indicating light 53 forms a ring structure along the first edge 301 and the second edge 303. A length of the first edge 301 is represented by M. A length of the second edge 301 is represented by N. M is greater than N. The first edge 301 is a longest edge of the camera equipment 100. In other embodiments, M may be equal to N.

The first edge 301 extends along a first direction (X direction as shown in FIG. 6a). The second edge 303 extends along a second direction (Y direction as shown in FIG. 6a). The optical axis O of the optical element 12 may be parallel to a third direction. The first direction may be perpendicular with the second direction. The third direction may be perpendicular with the second direction. The third direction is perpendicular with the first direction.

A distance L2 between each orthographic projection 531a of each of the plurality of light units on the projection plane and a first axis B1 is greater than 15 mm but less than four out of five (4/5) of the length of the first edge 301. The first axis B1 is parallel to the second direction. The orthographic projection O' of the optical axis is on the first axis B1. A distance L3 between each orthographic projection 531a of each of the plurality of light units on the projection plane and a second axis B2 is greater than 15 mm but less than four out of five (4/5) of the length of the first edge 301. The second axis B2 is parallel to the first direction. The orthographic projection O' of the optical axis is on the second axis B2. The possibility of an emitting light range of the first indicating light 53 overlapping with an imaging angle of the optical element 12 is further reduced. A possibility of an interference caused by the first warning light 53 to an imaging of the lens 12 may be further reduced to improve an imaging quality of the camera 10.

A main processor 16 of the camera 10 is electrically coupled with the first indicating light 53. According to motion information obtained by a position sensor 14 of the camera 10, the main processor 16 sends a warning signal to the first indicating light 53, and then the first indicating light 53 may emit warning light to warn the passers-by and/or vehicles.

On the condition that an acceleration change value of the camera 10 within a first predetermined time threshold exceeds a first change threshold, the main processor 16 may send a first deceleration warning signal. According to the first deceleration warning signal, the first indicating light 53 emits first deceleration warning light.

In one embodiment, on the condition that an acceleration change value of the camera 10 within a first predetermined time threshold exceeds a first change threshold but less than a second change threshold, the main processor 16 may send the second deceleration warning signal to the first indicating light 53. The first indicating light 53 may emit the second deceleration warning light according to the second deceleration warning signal. When the acceleration change value of the camera 10 within the first predetermined time threshold exceeds the second change threshold, the main processor 16 sends the third deceleration warning signal to the first indicating light 53. The first indicating light 53 emits the third deceleration warning light according to the third deceleration warning signal.

According to the motion information obtained by the position sensor 14, the main processor 16 sends a turning warning signal to the first indicating light 53 to control the first indicating light 53 to emit a turning warning light.

The turning warning signal includes a first turning warning signal and a second turning warning signal. The turning warning light includes first turning warning light and second turning warning light. An angle change value within a second predetermined time threshold is obtained by the main processor 16 according to the acceleration information. When the angle change value within the second predetermined time threshold is greater than a first angle threshold, the main processor 16 determines a turning direction of the riding equipment according to a tilt direction of the attitude information. The turning direction includes a first turning (ex. left turning) and a second turning (ex. right turning). When the main processor 16 determines that the riding equipment is in a turn with a first turning direction, the first turning warning signal is sent to the first indicating light 53 by the main processor 16. The first indicating light 53 emits the first turning warning light according to the first turning warning signal. When the main processor 16 determines that the riding equipment is in a turn with a second turning direction, the second turning warning signal is sent to the first indicating light 53 by the main processor 16. The first indicating light 53 emits the second turning warning light according to the second turning warning signal.

In one embodiment, the turning warning signal includes a usual turning warning signal and a sharp turning warning signal. The turning warning light includes a usual turning warning light and a sharp turning warning light. When the angle change value within a second predetermined time threshold obtained by the position sensor 14 is greater than a second angle threshold but less than a third angle threshold, the main processor 16 determines that the riding equipment is running on a usual turn. The usual turning warning signal is sent to the first indicating light 53 by the main processor 16. The usual turning warning light is emitted by the first indicating light 53. When the angle change value within a second predetermined time threshold obtained by the position sensor 14 is greater than the third angle threshold, the main processor 16 determines that the riding equipment 1000 is running on a sharp turning. The sharp turning warning signal is sent to the first indicating light 53 by the main processor 16. The sharp turning warning light is emitted by the first indicating light 53. Different warning light is sent out by the first indicating light 53 for different turnings of the riding equipment, so as to better warn the passers-by and/or vehicles around the riding equipment.

In detail, the usual turning warning signal includes a first usual turning warning signal and a second usual turning warning signal. The sharp turning warning signal includes a first sharp turning warning signal and a second sharp turning warning signal. The usual turning light includes first usual turning light and second usual turning light. The sharp turning light include first sharp turning light and second sharp turning light. When the angle change value within a second predetermined time threshold obtained by the position sensor 14 is greater than a second angle threshold but less than a third angle threshold, the main processor 16 determines that the riding equipment is running on the usual turning. The main processor 16 determines the turning direction of the riding equipment running in the usual turning, according to a tilt direction of the attitude information. The main processor 16 determines that the turning direction is the first turning when the riding equipment running in the usual turn, the first usual turning warning signal is sent to the first indicating light 53 by the main processor 16. The first usual turning warning light is emitted by the first indicating light 53 when receiving the first usual turning warning signal. The main processor 16 determines that the turning direction is the second turning when the riding equipment running in the usual turn, the second usual turning warning signal may be sent to the first indicating light 53 by the main processor 16. The second usual turning warning light is emitted by the first indicating light 53 when receiving the second usual turning warning signal.

When the angle change value within the second predetermined time threshold obtained by the position sensor 14 is greater than the third angle threshold, the main processor 16 determines that the riding equipment is running on the sharp turning. The main processor 16 determines that the turning direction of the riding equipment running in the sharp turning, according to a tilt direction of the attitude information. The main processor 16 determines that the turning direction is the first turning when the riding equipment running in the sharp turn, the first sharp turning warning signal is sent to the first indicating light 53 by the main processor 16. The first sharp turning warning light is emitted by the first indicating light 53 when receiving the first sharp turning warning signal. The main processor 16 determines that the turning direction is the second turning when the riding equipment running in the sharp turn, the second sharp turning warning signal is sent to the first indicating light 53 by the main processor 16. The second sharp turning warning light is emitted by the first indicating light 53 when receiving the second sharp turning warning signal.

Figure 8:
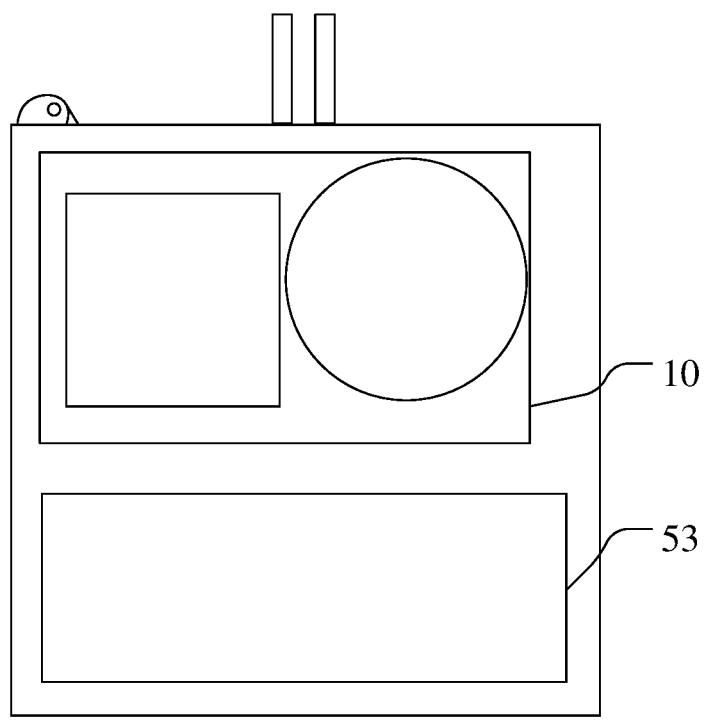
FIG. 8 is a front view of a camera equipment according to one embodiment of the present disclosure.

In other embodiments, the first indicating light 53 may be not in a cycle shape. As shown in FIG. 8, the first indicating light 53 is in a rectangular shape. The first indicating light 53 is located below the camera 10. The number of the first indicating light 53 may be two, three, or more.

The camera equipment 100 further includes a light sensor 56 on the camera housing device 30. The light sensor 56 is electrically coupled with the main processor 16. The light sensor 56 is used for detecting an ambient brightness of the camera equipment 100 and feedback the main processor 16. The main processor 16 sends a first starting signal to start the first indicating light 53 to emit light, on the condition that the main processor 16 determines that the ambient brightness obtained by the light sensor 56 is less than a predetermined brightness threshold.

A brightness of the warning light emitted by the first indicating light 53 according to the warning signal is greater than a brightness of the light emitted by the first indicating light 53 according to the first starting signal. And/or a flicker frequency of the warning light emitted by the first indicating light 53 according to the warning signal, is greater than a flicker frequency of the light emitted by the first indicating light 53 according to the first starting signal.

The camera equipment 100 further includes a second indicating light 57 positioned on a bottom of the camera housing device 30. The second indicating light 57 is electrically coupled with the main processor 16. The main processor 16 sends a second starting signal to start the second indicating light 57 to emit light, on the condition that the ambient brightness obtained by the light sensor 56 is less than the predetermined brightness threshold.

The second indicating light 57 includes a first laser module 571 and a second laser module 573. A distance between the first laser module 571 and the second laser module 573 is greater than 40 mm but less than 80 mm for reducing a interference between the first laser module 571 and the second laser module 573.

A first angle between a first normal line of the first emitting surface and a negative direction of a reference direction is greater than 0° but less than 15°. A second angle between a second normal line of the second emitting surface and a positive direction of the reference direction is greater than 0° but less than 15°. The first laser module 571 and the second laser module 573 are arranged along the reference direction and spaced from each other.

The camera equipment 100 further includes a power supply 59 electrically coupled with the main processor 16. The camera 10, the first indicating light 53, the main processor 16, the light sensor 56, and the second indicating light 57 are powered by the power supply 59. The power supply 59 may be a rechargeable battery or a non-rechargeable battery. A battery mode (size) of the power supply 59 may be chosen from 18650 and 21700. In other embodiments, the battery mode of the power supply 59 is not limited.

In other embodiments, the first indicating light 53 is positioned on the camera 10. The camera equipment 100 includes a first indicating light 53 and an optical element 12. The first indicating light 53 includes a plurality of light units. A distance between an orthographic projection of each of the plurality of light units on a projection plane, and an orthographic projection of an optical axis of the camera on the projection plane, is greater than 15 mm. The projection plane is perpendicular to the optical axis.

In other embodiments, the light sensor 56 may be positioned on the camera 10.

Figure 9:
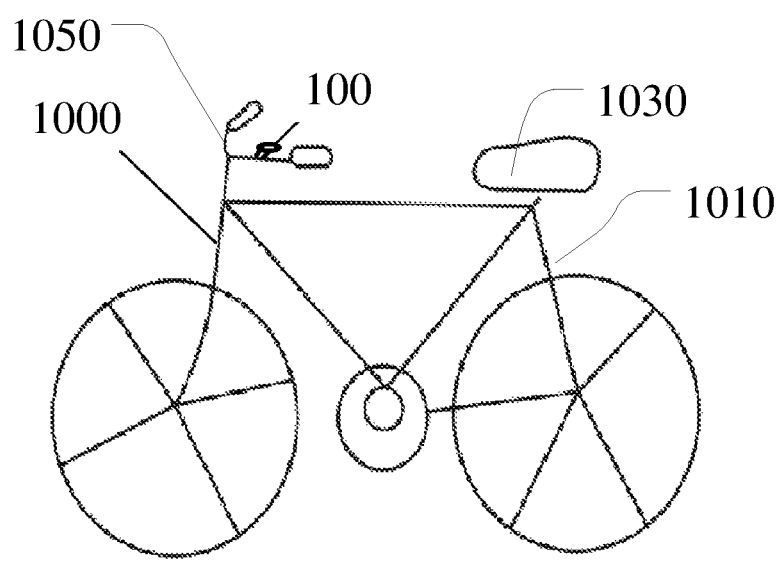
FIG. 9 is a schematic diagram of a camera equipment applied on a riding equipment according to one embodiment of the present disclosure.

Referring to FIG. 9, a camera equipment 100 applied on a riding equipment 1000 is provided in one embodiment. The riding equipment 1000 is a bicycle. The riding equipment 1000 includes a frame 1010, a saddle 1030, and a handlebar 1050. The saddle 1030 and the handlebar 1050 are mounted on the frame 1010. The camera equipment 100 is positioned on the handlebar 1050 of the riding equipment 1000 for capturing front images of a front view of the riding equipment 1000.

In other embodiments, the camera equipment 100 may be mounted on other portions of the riding equipment 1000 which may provide enough installation and front view space for the camera equipment 100. For example, the camera equipment 100 may be mounted on a handlebar 1050 for capturing front images of the riding equipment 1000.

Figure 10:
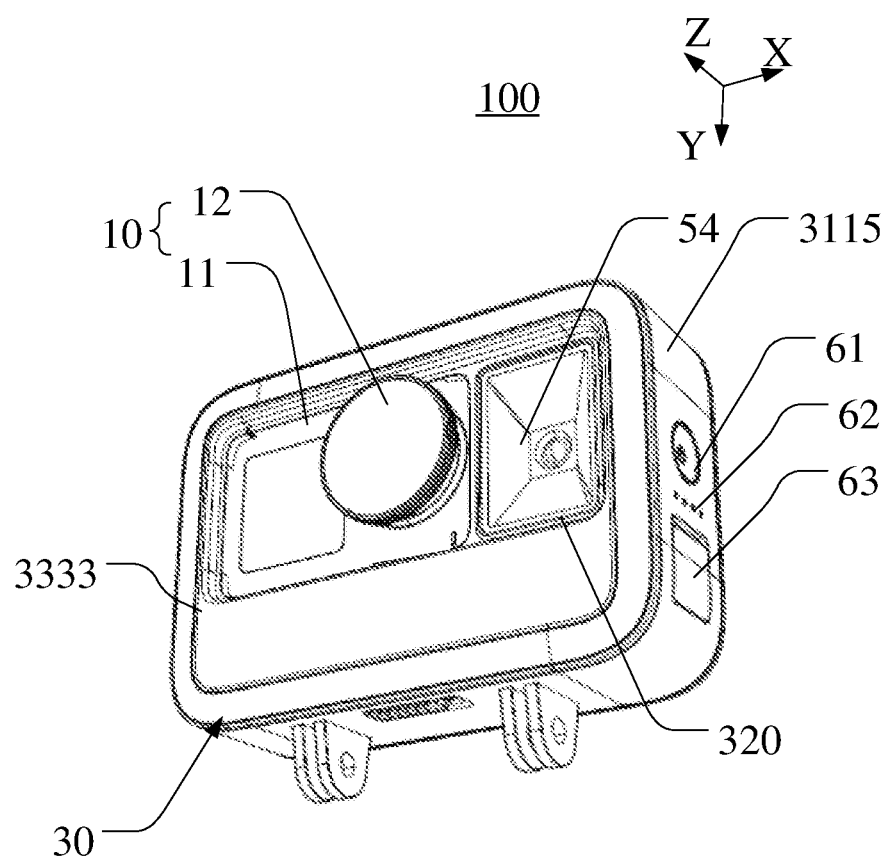
FIG. 10 is a schematic structural diagram of the camera equipment according to one embodiment of the present disclosure.
Figure 11A:
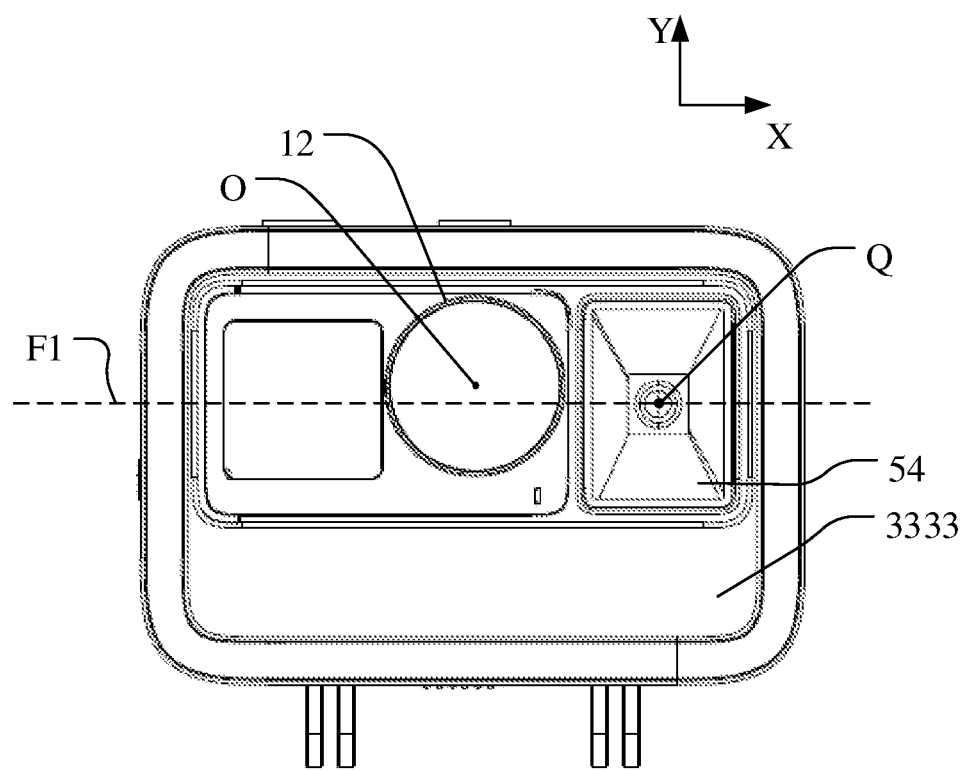
FIG. 11*a* is a front view of the camera equipment according to one embodiment of the present disclosure.
Figure 12:
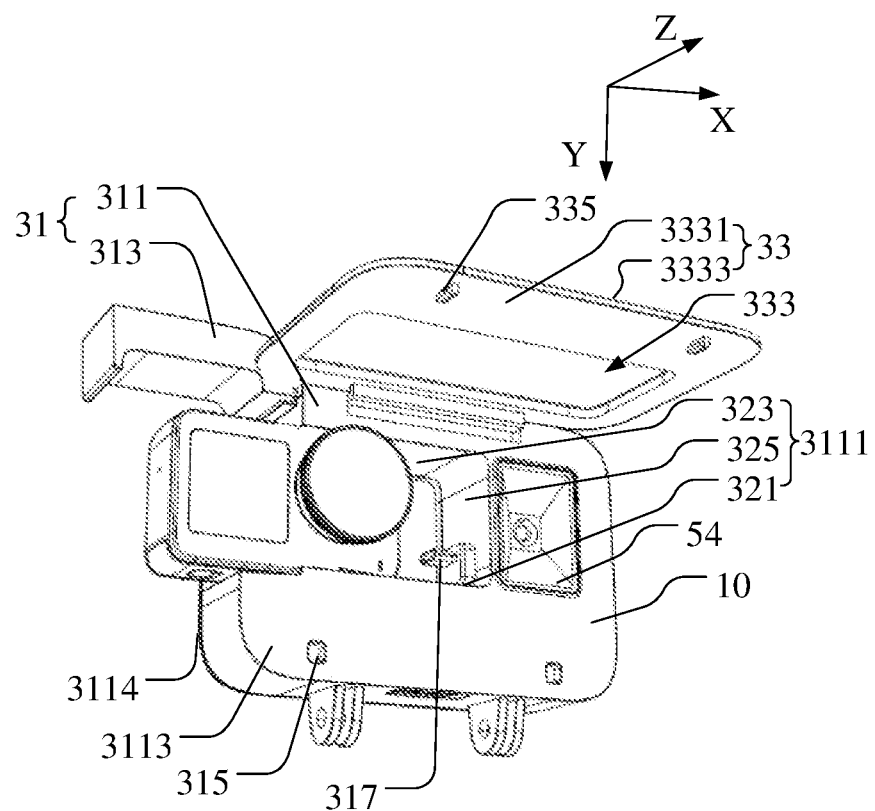
FIG. 12 is an exploded view of a camera equipment according to one embodiment of the present disclosure.

Referring to FIG. 10, FIG. 11a and FIG. 12, the camera equipment 100 includes a camera 10 and a camera housing device 30 detachably connected with the camera 10. A new camera 10 or a new camera housing device 30 may be directly replaced for convenience, when one of the camera 10 and the camera housing device 30 is damaged or needs to be replaced for other reasons.

Figure 13:
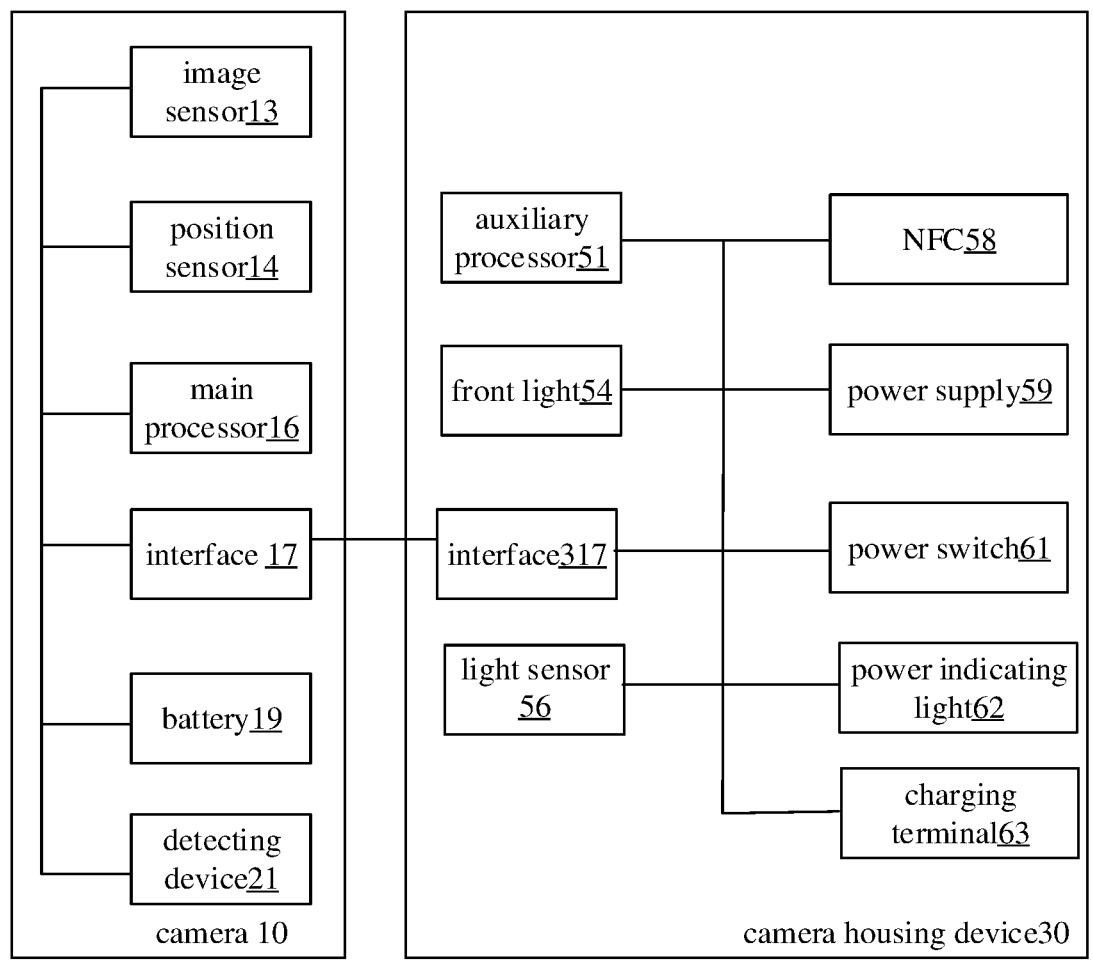
FIG. 13 is a block diagram of the camera equipment as shown in FIG. 11*a*.

Referring to FIG. 13, the camera 10 includes a housing 11, an optical element 12, an image sensor 13, a position sensor 14, and a main processor 16. The optical element 12, the image sensor 13, the position sensor 14, and the main processor 16 are supported by the housing 11.

The optical element 12 may include instrument(s), tool(s), and/or medium that acts upon light passing through the instrument(s)/tool(s)/medium. For example, the optical element 12 may include one or more of lens, mirror, prism, and/or other optical elements. The optical element 12 may affect direction, deviation, and/or path of the light passing through the optical element 12. The optical element 12 may be configured to guide light within an optical field of view to the image sensor 13.

The image sensor 13 may include sensor(s) that converts received light into output signals. The output signals may include electrical signals. For example, the image sensor 13 may include one or more of a charge-coupled device sensor, an active pixel sensor, a complementary metal-oxide semiconductor sensor, an N-type metal-oxide-semiconductor sensor, and/or other image sensors. The image sensor 13 may generate output signals conveying information that defines one or more images (e.g., video frames of a video). For example, the image sensor 13 may be configured to generate an image output signal based on light that becomes incident thereon during capture duration. The image output signal may convey image information that defines images with the optical field of view.

The position sensor 14 is communicated with the main processor 16. The position sensor 14 is used for detecting motion information. The motion information is transmitted to the main processor 16. The motion information may include direction, amount, velocity, acceleration information, and so on. The position sensor 14 may include sensor(s) that converts experienced positions/motions into output signals. The output signals may include electrical signals. For example, the position sensor 14 may refer to a set of position sensors, which may include one or more inertial measurement units, one or more accelerometers, one or more gyroscopes, and/or other position sensors. The position sensor 14 may generate output signals conveying information that characterizes positions of the position sensor 14 and/or device(s) carrying the position sensor 14. For example, the position sensor 14 may be configured to generate a position output signal based on positions of the camera 10 during the capture duration.

The main processor 16 is shown as a single component in FIG. 13, but it is just for illustrative purposes only. The main processor 16 may include one or more processors (logic circuitry) that provide information processing capabilities in the camera 10. The main processor 16 may provide one or more computing functions for the camera 10. The main processor 16 may operate/send command signals to one or more components of the camera 10 to operate the camera 10. For example, the main processor 16 may facilitate operation of the camera 10 in capturing image(s) and/or video(s), facilitate operation of the optical element 12 (e.g., change how light is guided by the optical element 12), and/or facilitate operation of the image sensor 13 (e.g., change how the received light is converted into information that defines images/videos and/or how the images/videos are post-processed after capture).

The main processor 16 may include memory, such as a random-access memory device (RAM), flash memory, or another suitable type of storage device such as a non-transitory computer-readable memory. The memory of the main processor 16 may include executable instructions and data that can be accessed by one or more processors of the main processor 16.

For example, the main processor 16 may include one or more dynamic random access memory (DRAM) modules, such as double data rate synchronous dynamic random-access memory (DDR SDRAM). In some implementations, the main processor 16 may include a digital signal processor (DSP). In some implementations, the main processor 16 may include an application specific integrated circuit (ASIC). For example, the main processor 16 may include a custom image signal processor.

The camera 10 may further include an interface 17 electrically coupled to the main processor 16. The interface 17 may be used for electrically coupled with the camera housing device 30. In other embodiments, the camera 10 may further include other interfaces, such as a communication interface for transmitting images to others devices, a user interface for controlling capturing and/or watching images.

The camera 10 further includes a battery 19 to power the electrical elements of the camera 10.

Portions of the camera 10 may be communicated with each other via a bus (not shown).

The camera housing device 30 includes a base 31 and a cover 33. The base 31 is detachably mounted on the handlebar 1050 of the riding equipment 1000 for supporting the camera 10. The cover 33 is used for protecting the camera 10.

The base 31 includes a main body 311 and a snap portion 313. A receiving space 3111 is defined in on the main body 311 for receiving the camera 10. The cover 33 covers on the receiving space 3111. A first end of the snap portion 313 is rotatably connected with the main body 311 via a rotation shaft. The second end of the snap portion 313 is connected with the main body 311, for preventing the camera 10 from detaching the base 31. When the second end of the snap portion 313 is detached from the main body 311, the main body 311 forms an opening (not marked in the figure) communicating with the receiving space 3111. The camera 10 can slide into the receiving space 3111 through the opening.

It may be convenient to assemble the camera 10 on the base 31 or disassemble the camera 10 from the base 31, because of a snap connection between the main body 311 and the snap portion 313. In addition, the snap portion 313 and the main body 311 can connect together and form a ring to around the camera 10, for protecting the camera 10. In other embodiments, a shock-absorbing structure in contact with the camera 10 may be positioned on the base 31 to reduce vibrations of the camera 10.

In other embodiments, the snap portion 313 may be omitted. The camera 10 may be fixed on the base 31 in others ways. In one embodiment, the housing 11 of the camera 10 may include a first engagement portion, and a second engagement portion may be positioned on an inner wall of the receiving space 3111. One of the first engagement portion and the second engagement portion may be an elastic protrusion, another one of the first engagement portion and the second clamping may be a clamping hole used for engaging with the elastic protrusion. The elastic protrusion is received in the clamping hole when the camera 10 is installed in a predetermined position of the base 31.

The main body 311 includes a first surface 3113 (as shown in FIG. 12), a second surface 3114 (as shown in FIG. 12), and a side surface 3115 (as shown in FIG. 10). The first surface 3113 is oppositely positioned to the second surface 3114. The receiving space 3111 is defined through the first surface 3113 and the second surface 3114. The receiving space 3111 is a through hole or groove. A first end of the side surface 3115 is connected to the first surface 3113. A second end of the side surface 3115 is connected to the second surface 3114. The first surface 3113 faces towards the cover 33, when the cover 33 covers on the base 31. In other embodiments, the receiving space 3111 may be a groove, which defines through the first surface 3113 but not through the second surface 3114. A first locking portion 315 may be positioned on the first surface 3113 for engaging with the cover 33.

The cover 33 is rotatably connected with the main body 311, thus the cover 33 may be opened and closed on the main body 311. The cover 33 can be flipped relatively to the base 31 when a user (including the rider) needs to operate the camera 10 received in the receiving space 3111. A using convenience of the camera housing 30 and the camera equipment 100 may be improved.

A hollow-out area 333 is defined on the cover 33. A position of the hollow-out area 333 corresponds to a position of the optical element 12 when the camera 10 received in the receiving space 3111, for facilitating the user to operate the optical element 12 and other elements of the camera 10. The cover 33 may be made of a kind of non-transparent material. The cover 33 includes a third surface 3331 and a fourth surface 3333 (as shown in FIG. 12) opposite to the third surface 3331. The third surface 3331 faces towards the first surface 3113. Light can enter the receiving space 3111 through the hollow-out area 333. In other embodiments, the hollow-out area 333 can be omitted when the cover 33 may be made of light transmitting material.

The cover 33 further includes a second engagement portion 335 positioned on the third surface 3331. The first engagement portion 315 is connected with the second engagement portion 335 for avoiding a detachment of the cover 33 from the base 31, when the cover 33 covers the receiving space 3111.

In the illustrated embodiment, the first engagement portion 315 may be an engagement hole recessed on the first surface 3113. The second engagement portion 335 may be a buckle protruding on the third surface 3331. The buckle can be received in and engaged with the engagement hole.

In other embodiments, the first engagement portion 315 may be positioned on other positions of the base 31, and the second engagement portion 335 may be positioned on other positions of the cover 33. One of the first engagement portion 315 and the second engagement portion 335 may be an engagement hole, and another one of the first engagement portion 315 and the second engagement portion 335 may be a buckle for engaging with the engagement hole.

The camera housing device 30 further includes an auxiliary processor 51, a front light 54, and a light sensor 56. The auxiliary processor 51 is electrically coupled with the camera supported by the base 31.

The auxiliary processor 51 is shown as a single component in FIG. 13, but it is just for illustrative purposes only. The auxiliary processor 51 may include one or more processors (logic circuitry) that provide information processing capabilities in the camera housing device 30. The auxiliary processor 51 may provide one or more computing functions for the camera housing device 30. The auxiliary processor 51 may operate/send command signals to one or more components of the camera housing device 30 to operate the camera housing device 30.

The auxiliary processor 51 may include memory, such as a random-access memory device (RAM), flash memory, or another suitable type of storage device such as a non-transitory computer-readable memory. The memory of the auxiliary processor 51 may include executable instructions and data that can be accessed by one or more processors of the auxiliary processor 51.

For example, the auxiliary processor 51 may include one or more dynamic random access memory (DRAM) modules, such as double data rate synchronous dynamic random-access memory (DDR SDRAM). In some implementations, the auxiliary processor 51 may include a digital signal processor (DSP). In some implementations, the auxiliary processor 51 may include an application specific integrated circuit (ASIC). For example, the auxiliary processor 51 may include a custom image signal processor.

In the illustrated embodiment, the front light 54 is positioned on the main body 311 for illumination to improve a safety of the user when riding. The receiving space 3111. The receiving space 3111 and the front light 54 are arranged along a first direction (e.g. an X direction as shown in FIG. 10, FIG. 11*a*, and FIG. 12). An interface 317 (as shown in FIG. 12) protrudes from an inner wall of the receiving space 3111. The interface 317 is positioned between the camera 10 and the front light 54 when the camera 10 is received in the receiving space 3111. The camera 10 can slide into the receiving space 3111 and reach a predetermined position, and then the camera 10 and the front light 54 are arranged along the first direction (e.g. an X direction as shown in FIG. 10, FIG. 11*a*, and FIG. 12). A recess groove 320 (as shown in FIG. 10) may be defined on the main body 311. The recess groove 320 and the receiving space 3111 are arranged on the main body 311 along the first direction and spaced from each other. The front light 54 is fixed in the recess groove 320.

The interface 317 is docked to the interface 17 of the camera 10 when the camera 10 slides into the receiving space 3111 and reaches the predetermined position. Then the auxiliary processor 51 may be electrically coupled with the main processor 16. A wire trace structure may be simplified, it is because the interface 317 protrudes from the inner wall of the receiving space 3111 that the interface 17 and the interface 317 are directly and electrically coupled each other without any electrical wire exposed out of the camera housing device 30. It may be no need to plug a wire for electrical coupling between the camera 10 and the camera housing device 30 when the camera 10 slides into the base 31. Thus, an assembly of the camera equipment 100 may be simplified, and an efficiency of assembling the camera equipment 100 may be improved.

An inner wall of the receiving space 3111 includes a bottom wall 321, a top wall 323 and a sidewall 325. The bottom wall 321 and the top wall 323 are oppositely positioned to each other along a second direction (e.g. a Y direction as shown in FIG. 12). The second direction may be perpendicular with the first direction. A first end of the sidewall 325 is connected to the bottom wall 321. A second end of the sidewall 325 is connected to the top wall 321. The sidewall 325 is oppositely positioned to an opening of the receiving space 3111 and neighbored with the front light 54. A third direction may be perpendicular with the first direction. The third direction may be perpendicular with the second direction.

Figure 11B:
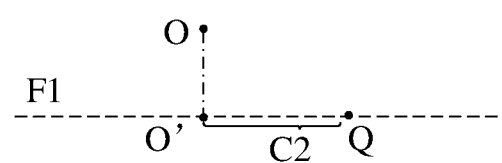
FIG. 11*b* is a schematic diagram of positions of an optical axis of an optical element, a center of a front light, and a reference plane of the camera equipment shown in the FIG. 11*a*.

A height of the receiving space 3111 along the second direction (e.g. a Y direction as shown in FIG. 12) is defined as H. In other words, a distance between the bottom wall 321 and the top wall 323 is defined as H. From a front view of the camera equipment 100 as shown in FIG. 11*a*, the front light 54 may be in a rectangular shape. A crossing point of two diagonals of the rectangular may be defined as a center Q of the front light 54. The recess groove 320 may be in a rectangular shape fitting a shape of the front light 54. Also referring to FIG. 11*b*, the center Q of the front light 54 may be positioned on a reference plane F1 (as shown in FIG. 11*a* and FIG. 11*b*). The reference plane F1 may be perpendicular with the second direction. A distance between the bottom wall 321 of the receiving space 3111 and the reference plane F1 is H/2 (half of H). In other words, a distance between a surface of the camera 10 attaching the bottom wall 321 and the reference plane F1 is a half of H (H/2). An optical axis O of the optical element 12 is spaced from the reference plane F1, in other words, the optical axis O of the optical element 12 is not positioned on the reference plane F1.

In other embodiments, the center Q of the front light 54 is positioned at the reference plane F1, because of unavoidable errors caused by manufacturing and assembly processes of the camera equipment 100. An orthographic projection (which is formed along the second direction) of the center Q of the front light 54 on the reference plane F1 is defined as a first orthographic projection Q'. A distance between the center Q of the front light 54 and the first orthographic projection Q' may be not greater than 5 mm. In other words, a vertical distance of the center Q between the reference plane F1 may be not greater than 5 mm. The front light 54 may include one or more light bead. The reference plane F1 may cross the camera 10 when being received in the receiving space 3111.

In other embodiments, the front light 54 may be not in a rectangular shape. For example, the front light 54 may be in a circular shape, and the center Q may be a center of the circular. The front light 54 may be in a polygon or other irregular shape.

Referring to FIG. 11*b*, an orthographic projection (which is formed along the second direction) of the optical axis O of the optical element 12 on the reference plane F1 may be defined as a second orthographic projection O'. Along the first direction, a distance C2 between the center Q of the front light 54 and the second orthographic projection O' may be greater than 15 mm but less than 50 mm. In the illustrated embodiment, along the first direction, the distance C2 between the center Q of the front light 54 and the second orthographic projection O' may be greater than 15 mm but less than 30 mm, for reducing a possibility of an emitting light range of the front light 54 overlapping with an imaging angle of the optical element 12, reducing an interference caused by the front light 54 to the imaging of the optical element 12 and improving an imaging quality of the camera equipment 100.

Figure 11C:
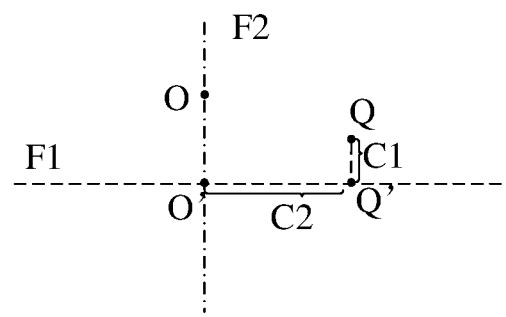
FIG. 11*c* is a schematic diagram of positions of an optical axis of an optical element, a center of a front light, and a reference plane of the camera equipment according to one embodiment of the present disclosure.

In other embodiments, referring to FIG. 11c, the center Q of the front light 54 may be spaced from the reference plane F1. An orthographic projection of the center Q of the front light 54 on the reference plane F1 may be defined as a first orthographic projection Q'. An orthographic projection of the optical axis O of the optical element 12 on the reference plane F1 may be defined as a second orthographic projection O'. A distance C2 between the center Q of the front light 54 and the second orthographic projection O' may be greater than 15 mm but less than 50 mm. In the illustrated embodiment, along the first direction, the distance C2 between the center Q of the front light 54 and the second orthographic projection O' may be greater than 15 mm but less than 30 mm. In other words, a vertical distance of the center Q of the front light 54 and a virtual plane F2 may be greater than 15 mm but less than 30 mm. The optical axis of the optical element 12 may be on the virtual plane F2. The virtual plane F2 may be vertical to the first direction.

In the illustrated embodiment, the camera housing device 30 further includes a light sensor 56 (as shown in FIG. 13) positioned on the side surface 3115 of the main body 311. The light sensor 56 is communicated with the auxiliary processor 51. The light sensor 56 is used for detecting an ambient brightness of the camera housing device 30 and feedback the auxiliary processor 51. The auxiliary processor 51 compares the ambient brightness obtained by the light sensor 56 with a predetermined brightness threshold. The auxiliary processor 51 determines that the environment of the camera housing device 30 is a low brightness environment, on the condition that the ambient brightness obtained by the light sensor 56 is less than the predetermined brightness threshold. Then the auxiliary processor 51 sends a starting signal to start the front light 54 to emit light. When the light sensor 56 detects that the riding equipment 1000 is in the low brightness environment, the front light 54 lights up for illumination, which brings convenience to the user and improve the safety of the user riding the riding equipment 1000 in the low brightness environment.

The camera 10 includes a non-riding mode and a riding mode. When the camera 10 is not installed on the riding equipment 1000, the camera 10 may work in the non-riding mode, because of a weak shaking. When the camera 10 is installed on the riding equipment 1000, the camera 10 may work in the riding mode for capturing high quality images. It is because that a motion of the riding equipment 1000 may bring a strong shaking. The camera housing device 30 may further include a near field communication (NFC) chip 58 positioned on the second end of the snap portion 313. The camera housing device 30 may further include a detecting device 21 for detecting the near field communication chip 58.

A distance between the camera 10 and the near field communication chip 58 is less than a predetermined distance threshold, when the camera 10 slides into the receiving space 3111 and reaches the predetermined position. The second end of the snap portion 313 is connected with the main body 311 after the camera 10 sliding into the receiving space 3111. If the distance between the camera 10 and the near field communication chip 58 is less than the predetermined distance threshold, an indicating signal is generated by the detecting device 21 of the camera 10. It means that the camera 10 is installed on the predetermined position of the camera housing device 30. The indicating signal may be also used for instructing the camera 10 enter the riding mode. The indicating signal may be transmitted to the main processor 16. The main processor 16 may control the camera 10 to enter the riding mode from the non-riding mode according to the instruction signal. The camera 10 can automatically switches into the riding mode to capture images without manual operation, when the distance between the camera 10 and the near field communication chip 58 is less than the predetermined distance threshold. The use convenience of the camera equipment 100 may be improved.

The camera housing device 30 further includes a power supply 59 received in the main body 311. The power supply 59 is electrically coupled with the auxiliary processor 51. The camera 10 and members (including the front light 54 and the auxiliary processor 51) of the camera housing device 30 are powered by the power supply 59. The power supply 59 may be a rechargeable battery or a non-rechargeable battery. A battery capacity of the power supply 59 may be not less than 2000 mAh. A battery mode (size) of the power supply 59 may be chosen from 18650 and 21700. In other embodiments, the battery capacity of the power supply 59 is not limited. The battery mode of the power supply 59 may be others. A rate of emission of light of the front lamp 54 may be in a range from 80 to 750 lumens for long battery endurance. In the illustrated embodiment, in order to providing a suitable brightness of the light emitted by the front light 54, the rate of emission of light of the front lamp 54 may be in a range from 300 to 500 lumens.

The camera housing device 30 further includes a power switch 61 positioned on a side surface 3115 for starting the power supply 59. In other embodiments, the power switch 61 may be positioned on other portions of the camera housing device 30. For example, the power switch 61 may be positioned on the top surface or the bottom surface of the main body 311.

The camera housing device 30 further includes a power indicating light 62 positioned on the side surface 3115. The power indicating light 62 is electrically coupled with the power supply 59. The power indicating light 62 is used for indicating a status of the power supply 59. In other embodiments, the power indicating light 62 may be positioned on other portions of the camera housing device 30.

The camera housing device 30 further includes a charging terminal 63 positioned on the side surface 3115 for charging the power supply 59. In other embodiments, the charging terminal 63 may be positioned on other portions of the camera housing device 30. For example, charging terminal 63 may be positioned on the top surface or the second surface of the main body. In other embodiments, the cover 33 may be omitted.

Figure 14:
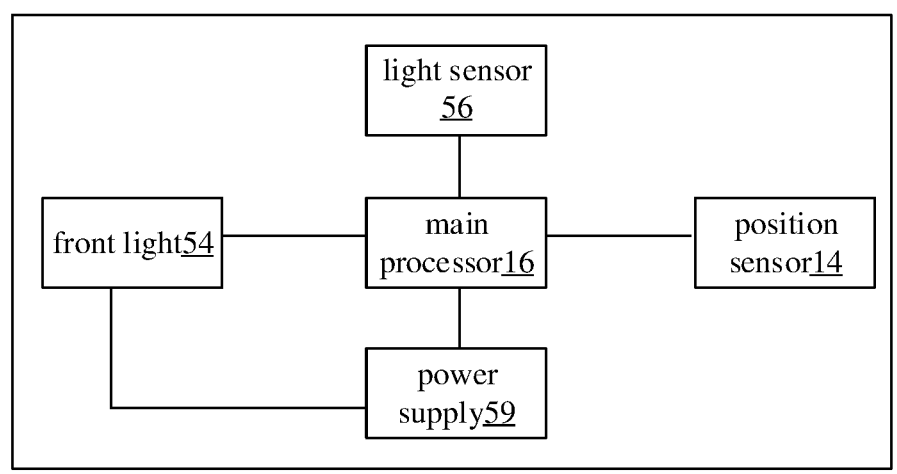
FIG. 14 is a block diagram of the camera equipment according to one embodiment of the present disclosure.

Referring to FIG. 14, a camera equipment 100 provided in one embodiment, that the camera 10 is integrated with the camera housing device 30. In other words, the camera 10 is embodied in the camera housing device 30 to simplify a structure of the camera equipment 100.

The light sensor 56 is communicated with the main processor 16. The light sensor 56 is used for detecting an ambient brightness of the camera equipment 100 and feedback the main processor 16. The main processor 16 compares the ambient brightness obtained by the light sensor 56 with the predetermined brightness threshold. The main processor 16 determines that the riding equipment is in a low ambient brightness environment, on the condition that the main processor 16 determines that the ambient brightness obtained by the light sensor 56 is less than the predetermined brightness threshold. Then the main processor 16 sends a first starting signal to start the front light 54. The front light 54 emits light according to the first starting signal.

A function of the position sensor 14 is similar to that described in the third embodiment and will not be repeated here.

A vertical distance of a center of the front light 54 and a virtual plane is greater than 15 mm but less than 50 mm. The camera 10 and the front light 54 are arranged along a first direction. An optical axis of the optical element of the camera 10 is on the virtual plane. The virtual plane may be vertical to the first direction. In the illustrated embodiment, the vertical distance of a center of the front light 54 and a virtual plane is greater than 15 mm but less than 30 mm.

The camera 10 further includes a bottom wall and a top wall. The bottom wall and the top wall may be oppositely positioned along a second direction vertical to the first direction. A vertical distance between the center of the front light 54 and a reference plane is not greater than 2 cm (centimeter). The reference plane may be perpendicular with the second direction. A distance between the bottom wall of the camera 10 and the reference plane is half of a distance between the bottom wall and the top wall. A distance between the center of the front light 54 and the reference plane may be not greater than 5 mm.

The camera housing device 30 further includes a power supply 59 electrically coupled with the front light 54 for providing power to the front light 54 and the camera 10. A battery mode (size) of the power supply 59 may be chosen from 18650 and 21700.

A battery capacity of the power supply 59 may be not less than 2000 mAh. A rate of emission of light of the front lamp 54 may be in a range from 80 to 750 lumens for long battery endurance. In the illustrated embodiment, in order to providing a suitable brightness of the light emitted by the front light 54, the rate of emission of light of the front lamp 54 may be in a range from 300 to 500 lumens.

The above described embodiments are preferred embodiments of the present disclosure. It should be noted that, persons of ordinary skill in the art, based on the idea of the present disclosure, will have changes in specific implementation manners and application ranges. In summary, the contents of the present specification should not be construed as limiting the present disclosure.

What is claimed is:

1. A camera housing device comprising,
   a base defining a receiving space to receive a camera;
   a cover configured to cover the receiving space;
   a first electrical connection terminal provided on the base;
   a first indicating light provided on the cover and configured for emitting warning light; and
   a second electrical connection terminal provided on the cover and electronically coupled to the first indicating light, wherein the second electrical connection terminal is electronically coupled with the first electrical connection terminal when the cover covers the receiving space.

2. The camera housing device of claim 1, wherein the camera housing device further comprises an auxiliary processor positioned in the base and electronically coupled with the first electrical connection terminal, wherein the auxiliary processor is configured for receiving a warning signal sent by the camera; wherein the second electrical connection terminal is electronically coupled with the first electrical connection terminal when the cover covers on the base.

3. The camera housing device of claim 2, wherein the warning signal comprises a first deceleration warning signal, the warning light comprises first deceleration warning light, wherein the auxiliary processor controls the first indicating light to emit the first deceleration warning light based on the first deceleration warning signal, on the condition that an acceleration change value of the camera within a first predetermined time threshold exceeds a first change threshold.

4. The camera housing device of claim 2, wherein the warning light further comprises second deceleration warning light and third deceleration warning light, wherein a brightness of the second deceleration warning light is less than a brightness of the third deceleration warning light.

5. The camera housing device of claim 2, wherein the warning light further comprises second deceleration warning light and third deceleration warning light, wherein a flicker frequency of the second deceleration warning light is less than a flicker frequency of the third deceleration warning light.

6. The camera housing device of claim 2, wherein the warning light comprises turning warning light; the turning warning light comprises a usual turning warning light and a sharp warning light; wherein a brightness of the usual turning warning light is less than a brightness of the sharp turning warning light.

7. The camera housing device of claim 2, wherein the warning light comprises turning warning light; the turning warning light comprises usual turning warning light and sharp turning warning light; wherein a flicker frequency of the usual turning warning light is less than a flicker frequency of the sharp turning warning light.

8. The camera housing device of claim 2, wherein the camera housing device further comprises a light sensor for detecting an ambient brightness, wherein the light sensor is positioned on the base and electronically coupled with the auxiliary processor, wherein the auxiliary processor sends a first starting signal to start the first indicating light to emit light, on the condition that the auxiliary processor determines that the ambient brightness obtained by the light sensor is less than a predetermined brightness threshold.

9. The camera housing device of claim 8, wherein a brightness of the warning light emitted by the first indicating light according to the warning signal, is greater than a brightness of the light emitted by the first indicating light according to the first starting signal.

10. The camera housing device of claim 8, wherein a flicker frequency of the warning light emitted by the first indicating light according to the warning signal, is greater than a flicker frequency of the light emitted by the first indicating light according to the first starting signal.

11. The camera housing device of claim 8, wherein the camera housing device further comprises a second indicating light positioned on a bottom of the base and communicated with the auxiliary processor, wherein the auxiliary processor sends a second starting signal to start the second indicating light to emit light, on the condition that the ambient brightness obtained by the light sensor is less than the predetermined brightness threshold.

12. The camera housing device of claim 11, wherein the second indicating light comprises a first laser module and a second laser module, wherein a distance between the first laser module and the second laser module is greater than 40 mm but less than 80 mm.

13. The camera housing device of claim 12, wherein the first laser module comprises a first emitting surface, the second laser module comprises a second emitting surface, wherein a first angle between a first normalline of the first emitting surface and a negative direction of a reference direction is greater than 0° but less than 15°, wherein a second angle between a second normalline of the second emitting surface and a positive direction of the reference direction is greater than 0° but less than 15°, and the first laser module and the second laser module are arranged along the reference direction and spaced from each other.

14. The camera housing device of claim 1, wherein the base comprises a main body defining the receiving space and a snap portion, wherein a first end of the snap portion is detachably connected to the main body and a second end of the snap portion is engaged with the main body.

15. The camera housing device of claim 14, wherein the camera housing device further comprises a near field communication chip positioned on the second end of the snap portion, wherein the camera switches from a non-riding mode to a riding mode, on a condition that a distance between the camera and the near field communication chip is less than a predetermined distance threshold.

16. The camera housing device of claim 14, wherein an interface is positioned on a sidewall of the receiving space and configured for being electronically coupled to the camera, wherein the interface faces towards the snap portion when the second end of the snap portion is connected with the main body.

17. The camera housing device of claim 1, wherein the base comprises a main body, and the main body comprises a first surface positioning the first electrical connection terminal and a second surface, wherein the cover comprises a third surface positioning the second electrical connection terminal and a fourth surface positioning the first indicating light, wherein the third surface faces towards the first surface when the cover covers the main body.

18. A camera equipment, comprising,
a camera housing device comprising,
a base defining a receiving space;
a cover configured to cover the receiving space;
a first electrical connection terminal provided on the base;
a first indicating light provided on the cover and configured for emitting warning light; and
a second electrical connection terminal provided on the cover and electronically coupled to the first indicating light, wherein the second electrical connection terminal is electronically coupled with the first electrical connection terminal, and
a camera received in the receiving space and configured to electronically couple to the first electrical connection terminal.

19. A rear view system applied on a riding equipment, comprising,
a camera equipment, comprising,
a camera housing device comprising,
a base defining a receiving space and configured to be mounted on the riding equipment;
a cover configured to cover the receiving space;
a first electrical connection terminal provided on the base;
a first indicating light provided on the cover and configured for emitting warning light; and
a second electrical connection terminal provided on the cover and electronically coupled to the first indicating light, wherein the second electrical connection terminal is electronically coupled with the first electrical connection terminal, and
a camera received in the receiving space for capturing rear images of the riding equipment; and
a display device configured to be installed on the riding equipment for displaying the rear images.

* * * * *